United States Patent
Böhringer et al.

(10) Patent No.: US 11,511,146 B2
(45) Date of Patent: Nov. 29, 2022

(54) PROTECTIVE MATERIAL HAVING CATALYTIC AND/OR REACTIVE PROPERTIES AND THE PRODUCTION AND USE OF SAME

(71) Applicant: Blücher GmbH, Erkrath (DE)

(72) Inventors: Bertram Böhringer, Erkrath (DE); Cong Minh Nguyen, Erkrath (DE); Florian Strobl, Erkrath (DE)

(73) Assignee: BLÜCHER GMBH

( * ) Notice: Subject to any disclaimer, the term of this patent is extended or adjusted under 35 U.S.C. 154(b) by 682 days.

(21) Appl. No.: 16/338,067

(22) PCT Filed: Nov. 11, 2016

(86) PCT No.: PCT/EP2016/077412
§ 371 (c)(1),
(2) Date: Mar. 29, 2019

(87) PCT Pub. No.: WO2018/059722
PCT Pub. Date: Apr. 5, 2018

(65) Prior Publication Data
US 2020/0061403 A1    Feb. 27, 2020

(30) Foreign Application Priority Data

Oct. 1, 2016 (WO) .................. PCT/EP2016/001623
Oct. 7, 2016 (WO) .................. PCT/EP2016/001667
Oct. 10, 2016 (WO) .................. PCT/EP2016001674

(51) Int. Cl.
*A62D 5/00* (2006.01)
*B32B 5/16* (2006.01)
*B32B 7/12* (2006.01)

(52) U.S. Cl.
CPC .................. *A62D 5/00* (2013.01); *B32B 5/16* (2013.01); *B32B 7/12* (2013.01); *B32B 2264/108* (2013.01); *B32B 2266/0242* (2013.01); *B32B 2266/0278* (2013.01); *B32B 2307/726* (2013.01); *B32B 2571/00* (2013.01)

(58) Field of Classification Search
CPC combination set(s) only.
See application file for complete search history.

(56) References Cited

U.S. PATENT DOCUMENTS

| | | | |
|---|---|---|---|
| 8,647,419 B2* | 2/2014 | Kaskel | B01J 20/28028 2/457 |
| 2016/0038924 A1* | 2/2016 | Bohringer | B01J 37/04 502/171 |
| 2018/0207613 A1* | 7/2018 | Böhringer | C09J 7/38 |

* cited by examiner

*Primary Examiner* — Lynda Salvatore
(74) *Attorney, Agent, or Firm* — Edward E. Sowers; Brannon Sowers & Cracraft PC

(57) ABSTRACT

The invention relates to a catalytic and/or reactive unit, preferably in the form of a protective material with catalytic and/or reactive properties, particularly with the function of protecting from chemical and/or biological harmful and/or poisonous substances, preferably in the form of a textile protective filter material, as well as a method for producing same. The catalytic and/or reactive unit is particularly suitable for producing protective equipments and/or protective objects, and filter and filter materials of all types.

25 Claims, 6 Drawing Sheets

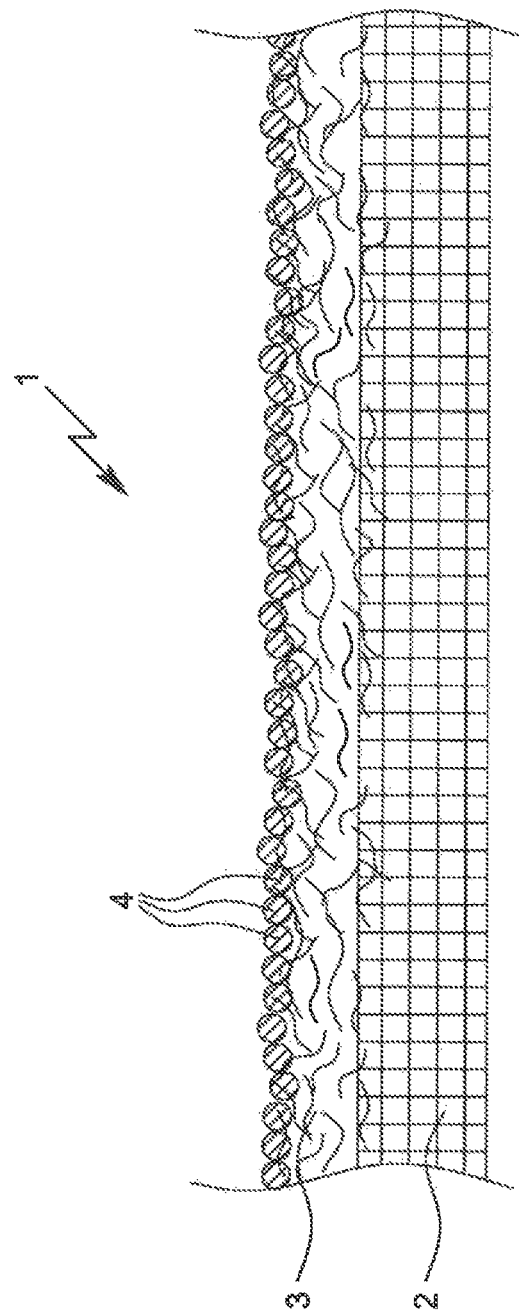

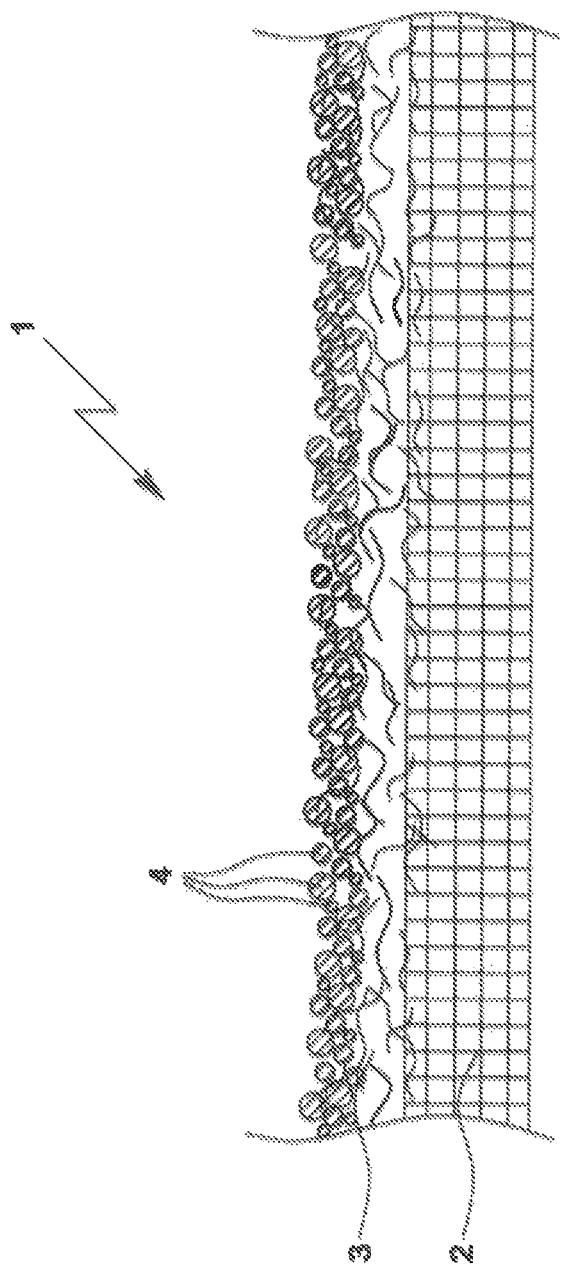

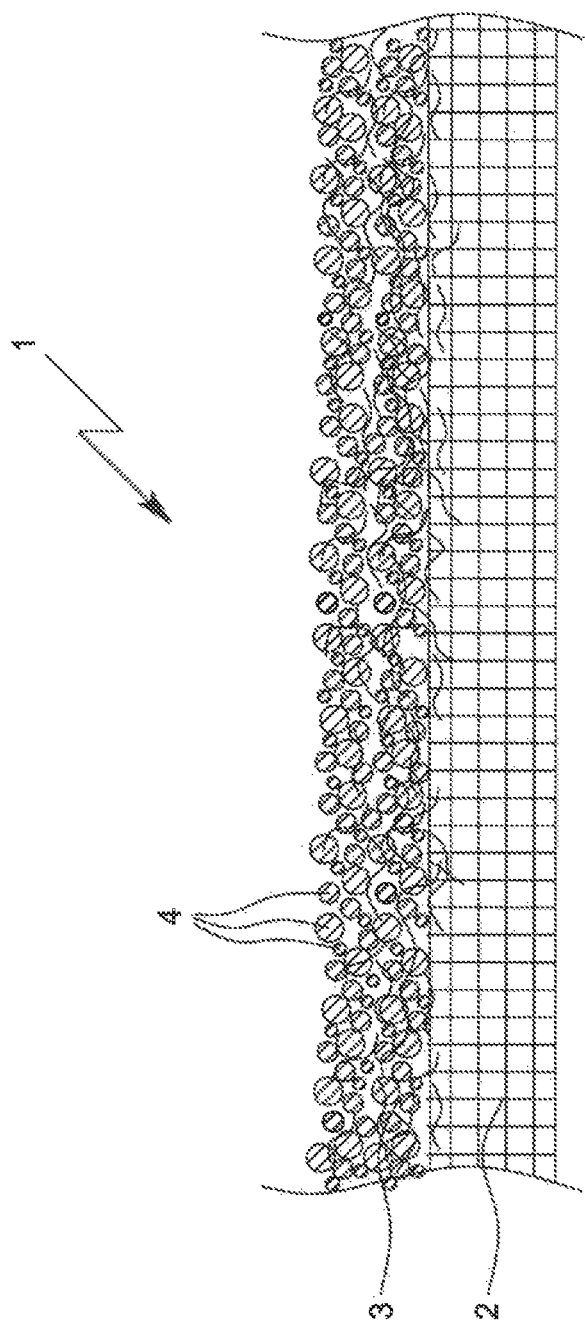

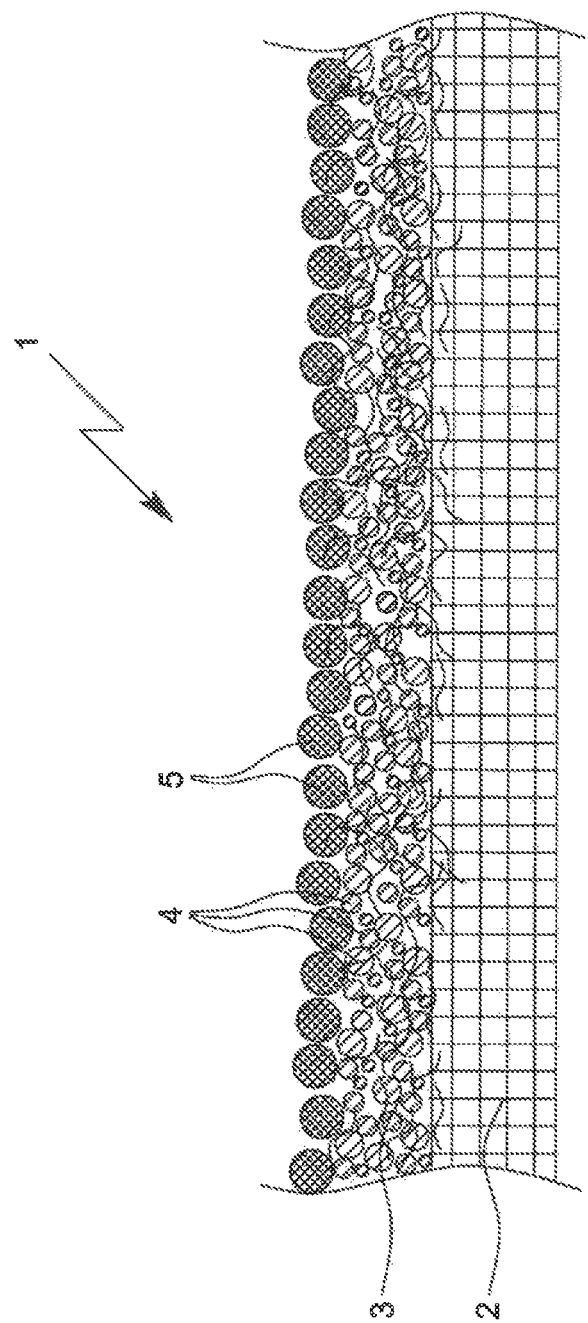

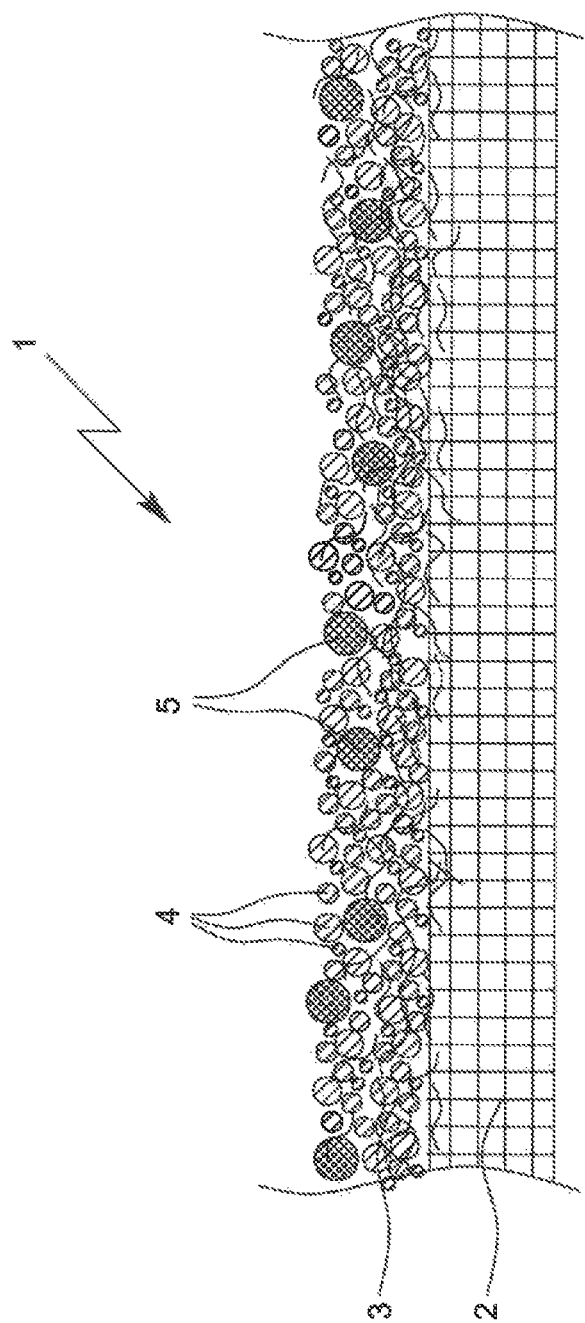

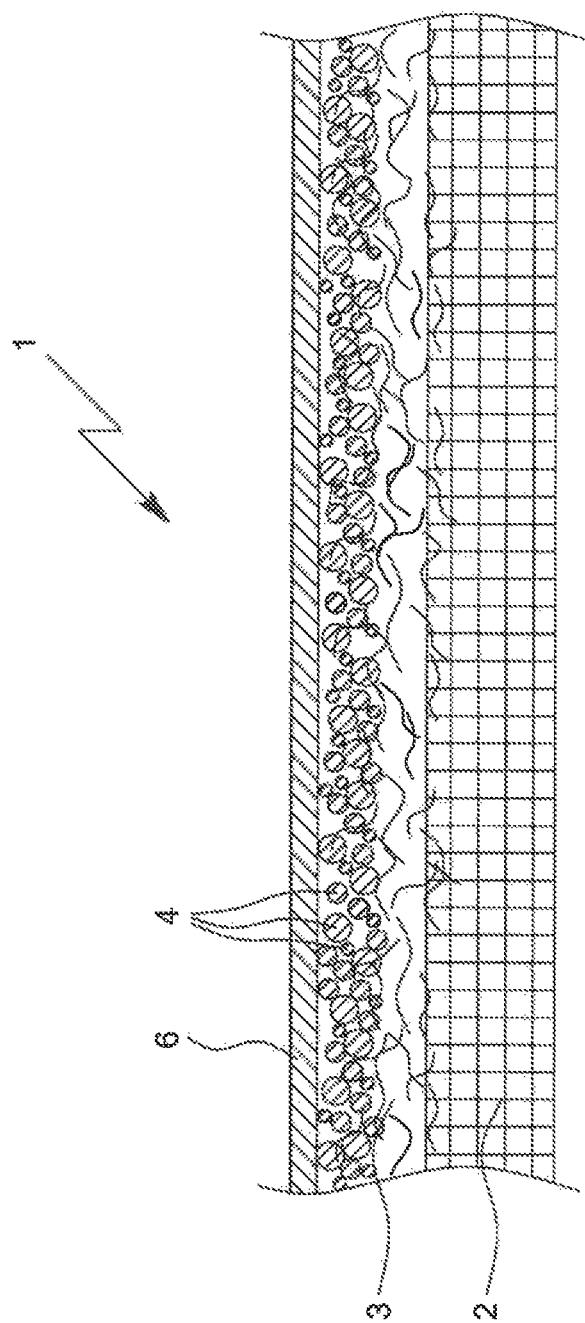

PROTECTIVE MATERIAL HAVING CATALYTIC AND/OR REACTIVE PROPERTIES AND THE PRODUCTION AND USE OF SAME

CROSS-REFERENCES TO RELATED APPLICATIONS

This application is a National Stage filing of International Application PCT/EP 2016/077412, filed Nov. 11, 2016, entitled PROTECTIVE MATERIAL HAVING CATALYTIC AND/OR REACTIVE PROPERTIES AND THE PRODUCTION AND USE OF SAME, claiming priority to PCT/EP 2016/001623, filed Oct. 1, 2016, to PCT/EP 2016/001667, filed Oct. 7, 2016, and PCT/EP 2016/001674, filed Oct. 10, 2016. The subject application claims priority to PCT/EP 2016/077412, to PCT/EP 2016/001623, to PCT/EP 2016/001667, and PCT/EP 2016/001674, and incorporates all by reference herein, in their entirety.

BACKGROUND OF THE INVENTION

The present invention pertains to the technical field of catalytically active or reactive units or systems which comprise a catalytically active or reactive component, said catalytically active or reactive component being applied in particular on a carrier. Within this context, the present invention pertains in particular to the technical field of protective materials having catalytic or reactive properties, which protective materials may be used, for example, for protective apparel or for filters in the civilian or military sphere, as for example for producing protective suits or the like.

Within this context, the present invention pertains in particular to a catalytic or reactive unit which is present preferably in the form of a protective material having catalytic or reactive properties and which in particular exhibits a protective function toward chemical and/or biological noxiant and/or poison agents, where, in accordance with the invention, the catalytic or reactive unit may be configured, for example, in the form of a textile protective filter material, and where the catalytic or reactive unit of the invention comprises a multiplicity of discrete catalytic or reactive particles.

The present invention also, furthermore, pertains to a method for producing the catalytic or reactive unit according to the invention, and also to specific uses of the catalytic or reactive unit of the invention, especially for producing protective equipment and/or protective articles and also for producing filters and filter materials.

The present invention pertains equally also to protective equipment and/or protective articles, on the one hand, and to filters and filter materials, on the other hand, which comprise the catalytic or reactive unit of the invention and/or which are produced using the unit of the invention having catalytic or reactive properties.

Chemical and biological noxiant and/or poison agents, such as chemical and biological warfare agents, for example, generally pose a high potential hazard to people coming into contact with such substances, such as, for example, soldiers in combat deployment, and also people working within fire or disaster management. Chemical and biological noxiant and/or poison agents often present great problems as well since exposure to or contact with even small amounts of such substances may lead to sustained and occasionally permanent physical impairment, or even death, of those people confronted with these substances.

In this regard, there are a series of substances or agents which are taken up on contact with the skin and/or the mucous membranes of the body and which even in small amounts or concentrations lead to serious physical harm:

These may include, within the field of chemical poison or warfare agents, particularly the vesicant HD (Yellow Cross) and the nerve agent sarin. People who may come into contact with such highly toxic poisons are required accordingly to wear suitable protective apparel and/or to be protected against these substances or poisons by means of suitable protective materials.

This is also true, correspondingly, of biological noxiant or poison agents, such as toxins of biological origin, which similarly lead to sometimes sustained health problems on contact and/or by subsequent uptake into the body, via mucous membranes or the like, for example.

In the case of disasters as well, as for example in conflagrations, especially affecting industrial plants or the like, it is common for highly toxic combustion products to occur. Originally benign substances may in such cases undergo chemical reactions that form a multiplicity of hazardous substances. These substances may propagate via the air, if they are discharged from the fire site in the hot fire phase together with the smoke. The composition and amount of noxiant or poison agents forming in the course of fires are dependent on the fire conditions and the materials involved in the fire. Forming at high concentration, in addition to carbon monoxide, are often also oxides of nitrogen, sulfur dioxide, hydrogen sulfide, hydrogen chloride, hydrogen bromide, hydrogen cyanide or prussic acid, ammonia, phosgene, and the like. Moreover, numerous further toxic derivatives with a harmful effect on health, such as dioxins and furans, may occur, particularly if problematic precursors are present. Consequently, appropriate protective measures are mandatory for those people working within disaster or fire management, in order to prevent contamination and/or contact with the toxic substances concerned.

The requirements in terms of appropriate protective materials with protective function toward the aforesaid chemical and/or biological noxiant and/or poison agents are extremely exacting not only due to the high toxicity of the substances concerned but also because the noxiant and/or poison agents in question may take a large number of forms and/or states: They may, for instance, be present generally in gaseous form, in the form of finely divided particles, such as aerosols or the like, or else in liquid form as such, and so for these reasons as well the protective materials concerned must exhibit a high breadth of protection, namely not only in relation to different toxic substances as such, with specific chemical properties in each case, but also with regard to the presence of these substances in the form of gases, aerosols, liquids or the like. It is necessary, moreover, to ensure high mechanical stability on the part of the protective materials and at the same time a high level of wear comfort on the part of protective equipment or apparel produced from them.

Means known in the prior art for providing a certain protective function toward the aforementioned noxiant and/or poison agents, especially chemical and/or biological warfare agents, include, for example, air-impervious and water vapor-impervious systems which can be used to form protective suits or the like and which in general are equipped with a rubber layer that is impervious to poison and/or warfare agents, particularly of the kind stated above. While such protective systems do offer a certain level of protection against the aforesaid substances, they carry the major disadvantage that protective equipment produced from them, examples being protective suits or the like, cause a very rapid buildup of heat in the donned/employed state, as for example in the context of combat deployment or disaster deployment involving a high level of physical exertion on the part of the wearer, since systems of this kind have no air or water vapor perviosity and so lack any moisture- and temperature-regulative properties, particularly since there is neither any breathability nor any ventilation.

Moreover, the materials used in the prior art for the purpose, for example, of producing protective suits include those which are furnished with an air-impervious but water vapor-pervious membrane, the membrane being intended to function correspondingly as a barrier layer with respect to toxic substances. A protective material of this kind is described, for example, in WO 96/37365 A1 and also in—belonging to the same patent family—U.S. Pat. No. 5,743,775 A and DE 195 18 683 A1. Protective suits of this kind having a membrane which is indeed pervious to water vapor and yet impervious to poisons, especially contact poisons, are hampered by the fundamental disadvantage that at leak sites—which may come about, for example, as a result of mechanical damage during combat or disaster deployment—poisons may penetrate to the interior of the protective suit, remain within the protective suit, and, consequently, be taken up via the skin of the wearer. In addition, the wear comfort of such protective systems in general is not always satisfactory because of the altogether limited ventilation.

For the purpose of improving not least the wear comfort, the prior art also knows of air-pervious, permeable protective materials which in general feature an adsorptive layer based on activated carbon, the activated carbon being capable of durably binding the relevant poison or warfare agents, especially the chemical poisons, so that even heavily contaminated suits, in addition to the protective function provided, also fundamentally pose no risk to the wearer. The overall level of wear comfort of such protective systems is high, owing to the high level of exchange of air and water or water vapor, particularly since a further advantage is that the activated carbon used is also accessible on the inside, i.e., on the side of the protective material that is facing the wearer, meaning that poison that has penetrated can be rapidly adsorbed and rendered harmless. In terms of their overall function, however, even protective systems of these kinds are sometimes deserving of improvement. Known in this context, for example, are air-pervious, permeable protective suits where activated carbon, especially in powder form, is applied in a dispersion—using an adherent, to a carrier layer. Yet here there is a general disadvantage in that the complete introduction of the activated carbon into the adherent limits the accessibility of the activated carbon for substances to be adsorbed.

Moreover, in the prior art relating to air-pervious or permeable protective suits, it is known practice for the activated carbon used in this context to be fixed in punctuate form, especially on the basis of a predetermined uniform grid, by using an adherent applied discontinuously (in discontinuous-punctuate manner) on a carrier; this generally results in an improvement in the air-perviosity of such systems. In this context, however, it may be the case that the distribution and/or arrangement of the adsorptive material in the protective material is sometimes not ideal in terms of ensuring a protective function with respect to noxiant and/or poison agents, particularly when the noxiant load is high. This non-ideal scenario exists, for example, in the event of the relevant adsorptive materials being applied too sparsely and/or with too great a distance between the adhesive dots with the respective particles of activated carbon. On discontinuous application of the adherent, in particular, there may possibly be excessive gapping between the individual dots of adhesive, and/or development of a strongly regular or gridlike patterning, with the possible consequence, however, of the protective performance being reduced, since toxic substances may occasionally penetrate through the protective material, between the resultant gaps.

Discontinuous application of adsorbents may also be deleterious sometimes because relatively small particulate structures of the adsorptive material used are generally less suitable for such application, particularly since on the one hand they may sink completely into the adhesive material, and are therefore no longer fully available for the adsorption of corresponding poison agents, and since, on the other hand, for small particle sizes there is a risk of the particle spacing, resulting in the context of the gridlike application, turning out to be too large. Under extreme conditions, especially if a drop of a thickened poison or warfare agent impinges on the protective material from a substantial height, the layer of activated carbon may also be locally overwhelmed. It may occasionally be the case with such materials, moreover, that the adherent, applied in punctuate or grid form, or the adhesive, may fall in part between the yarn system of the carrier when the material is being produced, and this is detrimental to the fixing of the adsorbents and may equally lead to bare patches.

Furthermore, in the case of protective suits which are pervious to air and water vapor and also, moreover, are pervious to water, the use of an adsorptive material in the form of activated carbon may occasionally result in premature exhaustion of the activated carbon, should the activated carbon—particularly in cases of high noxiant exposure and long wear or deployment times—become saturated with the adsorbed noxiant and/or poison agents, with the consequence, so to speak, that the adsorptive capacity may be exhausted.

In order to bring further improvement to the adsorptive performance of adsorbents in the form of activated carbon, provision may further be made in the prior art to equip activated carbon particles as such directly with a catalytically active component; this may be done by introducing a catalyst component into the activated carbon. Through the immediate and direct equipping of the activated carbon particles with corresponding catalytic or reactive qualities, it is possible in principle for previously adsorbed substances to be broken down catalytically and/or decomposed to form nontoxic substances, to the benefit of the adsorptive behavior of the activated carbon in relation to long deployment times as well, because substances picked up by the activated carbon can be broken down, and therefore previously occupied adsorption sites can be made reavailable.

A disadvantage with such approaches in the prior art, however, is that introducing a catalytically active or reactive substance into the pore system of the activated carbon-besides the relatively high process-related expense—can lead on the one hand to the overall adsorptive capacity of the activated carbon being limited, owing to the catalyst occupying part of the pore system of the activated carbon, and, moreover, the pores may become clogged with the catalyst. Moreover, the catalyst incorporated into the pore system is occasionally itself not ideally accessible by the substances that are to be decomposed. For instance, DE 29 36 362 C2 concerns a method for producing a palladium-on-carbon catalyst, where the palladium is to be deposited by reduction on a catalyst support in the form of carbon suspended in an organic medium. The carbon support used in this context is pulverulent activated carbon, carbon black or graphite. As noted above, such systems do not always have ideal catalytic and/or adsorptive properties, owing in particular to a reduction in the adsorptive capacity in conjunction with impaired accessibility of the catalyst.

Against this background, there are also approaches in the prior art to using a catalytically active substance as such for corresponding protective systems, such as for producing protective suits or the like, for example. An approach taken in this context in the prior art, for example, is to provide a functional protective material by catalytically and/or reactively furnishing a membrane that is used as a barrier layer with respect to noxiant and/or poison agents. For this purpose, a catalytically active component may be applied, for example, to a membrane provided beforehand, although an associated disadvantage to this is that occasionally the catalytically active component is not durably fixed on the membrane. Furthermore, provision may be made to furnish a membrane with the reactive component during actual production of the membrane, by means of copolymerization or the like, for example, but this carries the disadvantage that the availability of the catalyst, in the membrane acting as a barrier layer, for noxiant and/or poison agents intended to be broken down may again be reduced, with the possible consequence of an overall reduction in the protective function of such a system. Furthermore, the relevant membrane systems may also be air-impervious systems, which, however, is detrimental to the wear comfort of protective apparel produced on this basis.

BRIEF SUMMARY OF THE INVENTION

Altogether, therefore, in the prior art there exists a major demand for further-improved protective materials and/or units with protective function toward the relevant noxiant and/or poison agents, the intention being in particular to ensure a high wear comfort when using these materials, for example, as protective apparel, as well as a high protective function. This desire, however, is not always satisfactorily met in the systems that are known in the prior art.

Against this background, therefore, the problem addressed by the present invention is that of providing a specific unit, particularly in the form of a protective material, in which the above-outlined disadvantages of the prior art are at least largely avoided or else at least ameliorated. In particular, the unit provided in accordance with the invention is also to be suitable for the production of protective equipment and/or protective articles with protective function toward chemical and/or biological poison and/or warfare agents, and also of filters and filter materials.

A further problem addressed by the present invention is that of providing such a unit, especially in the form of a protective material, which combines high air perviosity and high water vapor perviosity with an effective protective function toward chemical and biological noxiant and poison agents, such as, in particular, chemical warfare agents. Here, in particular, the intention is to provide a protective function toward the relevant noxiant and poison agents that is improved relative to the prior art, while at the same time ensuring high air perviosity, associated with a high wear comfort when used for protective apparel or the like.

In this context, the unit provided in accordance with the invention is also to be suitable in particular for use in and for producing protective articles, such as, for example, protective suits, protective gloves, protective shoes, and other protective apparel items, and also protective covers, sleeping bags and the like, while ensuring high wear comfort. Yet a further problem addressed by the present invention, moreover, is that of providing a corresponding unit, especially in the form of a protective material or adsorptive filter material, preferably a catalytic or reactive protective material, which is suitable in particular for use in filters and filter materials (such as, for example, for removal of noxiant, odorant and poison agents of any kind, especially from air and/or gas streams, such as protective respirator filters, odor filters, sheet filters, air filters, adsorption-capable carrier structures, and filters for the medical sector), while ensuring high filter efficiency coupled with good flowability for the medium to be cleaned up.

In particular, the intention in accordance with the invention, in the context of a further problem addressed, is also to provide a unit which, on the basis of an improved protective function with respect to the relevant noxiant and/or poison agents, exhibits an overall increase in wear time or deployment time while durably ensuring the protective function. Moreover, the unit provided in accordance with the invention is intended to exhibit high durability and especially mechanical stability and also an optimized basis weight. The protective performance overall, moreover, is also to be increased.

Lastly, yet a further problem addressed by the present invention is that of providing a corresponding method for producing the unit of the invention, where the method provided in accordance with the invention is intended to lead, with high method efficiency and economy, to a unit with an overall performance capacity and with corresponding properties.

To solve the problem outlined above, therefore, the present invention—according to a first aspect of the present invention—proposes a catalytic and/or reactive unit, especially in the form of a protective material having catalytic and/or reactive properties, especially with protective function toward chemical and/or biological noxiant and/or poison agents, preferably in the form of a textile protective filter material, according to the description herein; particular advantageous developments and refinements of this aspect of the invention are further provided.

A further subject of the present invention—according to a second aspect of the present invention—is a method for producing the catalytic and/or reactive unit. Further advantageous refinements of the method of the invention similarly provided.

A further subject of the present invention—according to a third aspect of the present invention—is, moreover, the use of the catalytic and/or reactive unit of the invention for producing protective equipment and/or protective articles of any kind, and, respectively, for producing filters and filter materials of any kind.

Yet a further subject of the present invention—according to a fourth aspect of the present invention—concerns, moreover, the protective equipment and/or protective articles of the invention, which comprise the catalytic and/or reactive unit of the invention and/or are produced using the unit according to the invention, in accordance with the disclosure herein concerning the protective equipment and/or protective articles of the invention.

Finally, a further subject of the present invention—according to a fifth aspect of the present invention—concerns filters and filter materials which comprise the catalytic and/or reactive unit of the invention and/or are produced using the unit of the invention according to the disclosure.

It will be readily understood that in the description below of the present invention, such versions, embodiments, advantages, examples or the like as are recited below in respect of one aspect of the invention only, for the avoidance of unnecessary repetition, self-evidently also apply mutatis mutandis to the other aspects of the invention, without any need for this to be expressly mentioned.

It will also be readily understood that any values, numbers and ranges stated below shall not be construed as limiting the respective value, number and range recitations; a skilled person will also appreciate that in a particular case or in relation to a particular application, departures from the recited ranges and particulars are possible without leaving the realm of the present invention.

It is the case, moreover, that any value or parameter particulars or the like that are stated below can in principle be determined or quantified using standard or standardized or explicitly recited methods of determination or else otherwise using methods of determination/measurement that are familiar per se to the person skilled in this field. Unless otherwise indicated, the relevant values and parameters are determined under standard conditions (i.e., in particular at a temperature of 20° C. and/or at a pressure of 1013.25 hPa or 1.01325 bar).

As for the rest, any relative or percentage, especially weight-based, recitations of quantity that are given below shall be understood as having to be selected and/or combined by the skilled person, within the context of the present invention, in such a way that the sum total—including, where applicable, further components and/or ingredients, in particular as defined hereinafter—must always add up to 100% or 100 wt %. This, however, is self-evident to the skilled person.

BRIEF DESCRIPTION OF THE DRAWINGS

FIG. 1: provides a cross-sectional depiction of an inventive catalytic and/or reactive unit especially in the form of a protective material, where the unit comprises a carrier, especially a textile carrier, with a layer of adhesive applied thereon in the form of an air-pervious, dried and/or cured, broken adhesive polymer foam, where a multiplicity of individual catalytic and/or reactive particles are adhered on the layer of adhesive;

FIG. 2: provides a cross-sectional depiction of a further inventive catalytic and/or reactive unit, where the catalytic and/or reactive particles are disposed such that the catalytic and/or reactive particles are disposed and integrated, respectively, partially on the surface and partially in the layer of adhesive;

FIG. 3: provides a cross-sectional depiction of yet a further inventive catalytic and/or reactive unit, whereby the catalytic and/or reactive particles are disposed in such a way that the layer of adhesive is furnished over its entire thickness with the catalytic and/or reactive particles integrated therein;

FIG. 4: provides a cross-sectional depiction of yet a further inventive catalytic and/or reactive unit, whereby the inventive unit comprises catalytic and/or reactive particles disposed in the layer of adhesive and integrated into the layer of adhesive, and additionally adsorbent particles disposed and/or applied on the surface of the layer of adhesive;

FIG. 5: provides a cross-sectional depiction of a further inventive catalytic and/or reactive unit having catalytic and/or reactive particles catalytic and/or reactive particles integrated and/or disposed in the layer of adhesive and also having additional adsorbent particles likewise disposed and/or integrated in the layer of adhesive;

FIG. 6: provides a cross-sectional depiction of an inventive catalytic and/or reactive unit, where the inventive unit additionally comprises a covering layer, especially covering material, where the layer of adhesive with the catalytic and/or reactive particles is disposed between the carrier and the covering layer, especially covering material.

DETAILED DESCRIPTION OF THE INVENTION

This having been established, the present invention is described and elucidated in more detail below, including by means of drawings and figures depicting preferred embodiments and/or exemplary embodiments.

A subject of the present invention—according to a first aspect of the present invention—is therefore a catalytic and/or reactive unit, preferably in the form of a protective material having catalytic and/or reactive properties, especially with protective function toward chemical and/or biological noxiant and/or poison agents, preferably in the form of a textile protective filter material, where the unit comprises a—especially an air-pervious—carrier, especially in the form of a textile carrier, where the carrier is charged and/or furnished and/or provided with a multiplicity of discrete catalytic and/or reactive particles, where the catalytic and/or reactive particles are durably joined to the carrier, especially by means of adhesive bonding, and/or are bonded to the carrier, where the joining and/or adhesive bonding is accomplished and/or brought about by a layer of adhesive applied to the carrier, where the layer of adhesive is configured as an air-pervious and/or discontinuous layer based on a dried and/or cured, especially crosslinked, broken adhesive polymer foam.

This is because the applicant has found, completely surprisingly and unforeseeably, that in relation to the present invention, outstanding protective properties in conjunction with high wear comfort are achieved when a corresponding unit, especially for the provision of protective materials, is furnished in a specific way with catalytic or reactive properties. In particular, the applicant has surprisingly found that in relation to the catalytic or reactive unit of the invention, which is configured in particular in the form of a protective material having catalytic or reactive properties, with simultaneous provision of a high air transmission rate, an efficient protective function toward chemical and/or biological noxiant and/or poison agents, especially chemical and/or biological warfare agents, can be provided if a specific construction is envisaged for the unit provided in accordance with the invention: indeed, in accordance with the invention, catalytic and/or reactive particles for the provision of corresponding catalytic and/or reactive properties are secured and/or fixed on (meaning on and/or in) a layer of adhesive which is applied to a textile carrier, the layer of adhesive being air-pervious and being present specifically in the form of a dried and/or cured, especially crosslinked, broken or disintegrated adhesive polymer foam.

A central idea of the present invention is therefore that in order to provide corresponding catalytic and/or reactive properties, catalytic and/or reactive particles are present in the form of discrete particles which function, so to speak, as a catalyst, on (meaning on and/or in) a broken foam structure in the form of the relevant layer of adhesive, and/or are secured and/or fixed thereon.

In the context of the present invention, the term "broken" (also referred to synonymously as "disintegrated" and/or "destroyed"), as used in reference to the dried and/or cured, especially crosslinked, adhesive polymer foam and/or the layer of adhesive as such, should be understood in particular to mean that the broken adhesive polymer foam in accordance with the invention comprises an altogether air-pervious system or air-pervious layer which—especially in consequence of a specific procedure for producing the material, starting from a previously foamed and nondried dispersion or solution applied to the textile carrier, with subsequent drying and/or curing to break and/or destroy the foam structures—has in the dried and/or cured state, and therefore in relation to the ultimate or ready-to-use material, a multiplicity of destroyed or burst or collapsed foam bubbles. Accordingly, in relation to the dried and/or cured, especially crosslinked, broken adhesive polymer foam or the layer of adhesive that is present in accordance with the invention, it is also possible to refer to a foam which, while being disintegrated or destroyed, is nevertheless still coherent. The broken adhesive polymer foam, or the relevant destroyed foam bubbles, has or have a multiplicity of destroyed or broken or collapsed walls, lamellae and/or struts composed of the relevant adhesive polymer.

On the basis of the design according to the invention, whereby the foam structure, so to speak, is broken up and/or in particular destroyed in accordance with the remarks above, the result—without wishing to be limited to this theory—in conjunction with integrity and flexibility of the overall layer within the broken adhesive polymer foam of the layer of adhesive, is an air-pervious system which allows the passage of air transverse to the plane of principal extent of the layer of adhesive, resulting on this basis in an altogether air-pervious material. In the context of the present invention, provision may be made in respect of the broken adhesive polymer foam for, in particular, the (foam bubble) walls and/or the (foam bubble) lamellae to be destroyed or broken, while the fundamentally more stable struts of the foam system may not be destroyed or may be less greatly destroyed, leading to the maintenance of a stabilizing matrix structure of the relevant broken adhesive polymer foam, in which case at the same time the passage of air through the destroyed bubble walls along the broken foam with the catalytic and/or reactive particles incorporated or integrated therein and/or applied thereto, and/or transverse to the plane of extent of the resultant layer of adhesive, is made possible.

With regard to the inventively provided layer of adhesive, moreover, it is possible, according to one embodiment particularly preferred in accordance with the invention, for the broken adhesive polymer foam to be contiguous or coherent in construction. In other words, in the context of the present invention, it is the case in particular that the layer of adhesive overall is configured as a coherent material or as a layer with an altogether coherent matrix structure or framework structure, so that in the context of the present invention the stability or integrity underlying the layer as such is at least essentially unaffected. In this context, the broken constituents of the adhesive polymer foam—without wishing to be limited to this theory—to some extent form a coherent assembly, meaning that the respective constituents of the broken adhesive polymer foam are present overall in communication with one another in order to form a stable layer. The result of this is a high strength of the layer of adhesive based on the broken adhesive polymer foam, this being also beneficial to efficient fixing of the particles which are applied and/or incorporated.

On the basis of the inventive concept with the provision of a broken foam layer, as recited above, it is possible, while ensuring a high air transmission rate, leading in turn to high wear comfort when the unit of the invention is used for protective materials, and not least as a function of the particular end use, for the catalytic and/or reactive particles to be attached or fixed to the layer of adhesive in an optimized way, with regard both to a corresponding application of the catalytic and/or reactive particles on the layer of adhesive in the form of a broken foam, and also to a further attachment or fixing of the relevant catalytic and/or reactive particles in the layer of adhesive.

Through the optimized occupying of the layer of adhesive with the relevant particles, a uniform and complete furnishing of the material with corresponding catalytic and/or reactive properties is ensured, so preventing penetrations of noxiant and/or poison agents. Moreover, the provision of the layer of adhesive in the form of a broken foam system also improves the flow impingement behavior of the catalytic and/or reactive particles employed.

Because of the high air transmission rate and the presence of the layer of adhesive in the form of a broken foam, as recited above, the accessibility of the catalytic and/or reactive particles by the noxiant and/or pollutant agents requiring catalytic conversion is also improved, and so by this means as well the protective function of the feature provided in accordance with the invention is further improved. Consequently, moreover, the end products, more particularly nontoxic end products, which result from the catalytic breakdown can be transported away in an improved manner from the material.

A further central advantage of the design according to the invention is to be seen, moreover, in the fact that because of the purpose-directed use of defined discrete catalytic and/or reactive particles (i.e., catalytically active and/or reactive particles or corpuscles which in particular are of granular and/or spherical configuration), the protective function of the resultant unit of the invention or of the resultant protective material is ensured for a large and at least theoretically unlimited period of time, since the material in the form of a catalyst, during the conversion of the corresponding noxiant and/or poison agents, is itself not consumed or itself not exhausted.

In particular, the unit of the invention is highly suitable for the breakdown, especially catalytic and/or reactive breakdown, of various toxic substances or gases or noxiant and/or toxic agents. Generally speaking, these may include—for example and without limitation—those known as Chemical Warfare Agents (CWAs), Toxic Industrial Materials (TIMs), such as relatively large molecules, as for example ethylene oxide or the like, and Toxic Industrial Chemicals (TICs), such as $NH_3$, $SO_2$, $H_2S$, $Cl_2$, HCl or the like. The unit of the invention is also suitable in particular for negating the potential harm of polar noxiant and/or poison agents.

Moreover, it is possible in the context of the present invention, through the targeted use of discrete particles—which can also be designed individually in terms of the catalytic and/or reactive properties—to use catalytic systems and/or components that are optimized and/or selected to match the particular deployment background and/or application background, and so, in the context of the present invention, tailored catalytic and/or reactive units according to the invention can be provided, these units being optimized for the particular deployment and/or application scenario.

In this context it is also worth emphasizing that because of the design according to the invention, the catalytic and/or reactive properties provided are, so to speak, decoupled from any other measures present for providing a further protective function with respect to noxiant and/or poison agents, such as the additional use of activated carbon or the like, and so the respective systems involved do not have adverse influences on one another. For example, provision may be made in the context of the present invention, as detailed below, for the catalytic and/or reactive unit of the invention to also be furnished with an adsorptive material, in the form of activated carbon, for example. In this embodiment, catalytic and/or reactive properties on the one hand and adsorptive properties on the other are provided, so to speak, independently of or separately from one another, and so the respective systems as such and in mutual harmony can be designed individually. In this context, the catalytic and/or reactive particles used in accordance with the invention may also interact functionally with any adsorptive structures likewise present, based on adsorbent particles, for example, more particularly based on activated carbon, for the provision of a further protective function with respect to noxiant and/or poison agents; in this context it has surprisingly been found, in accordance with the invention, that the overall performance of the unit of the invention goes beyond the respective individual effect of the materials involved.

The catalytic and/or reactive particles used in accordance with the invention are more particularly materials and/or substances which act as catalysts and which are capable of increasing the rate of a chemical reaction by lowering the activation energy, without themselves being consumed. Moreover, the catalytic and/or reactive particles may also have reactive properties, especially chemical conversion of the noxiant and/or poison agents, in which case, in this respect, the catalytic and/or reactive particles may function as reaction partners or as reactants.

In this context, the term "catalytic and/or reactive" as used, for example, for the inventively provided unit or for the catalytic and/or reactive particles on which the unit of the invention is based, should be understood very broadly:

The term also and in particular pertains to the catalytic properties of the unit and of the particles in so far as they possess, in particular, the ability, through reactions that are in particular chemical reactions, as induced and/or catalyzed by the particles or by a catalytically active or reactive constituent or catalytic or reactive (active) component on which the particles are based, of converting noxiant and/or toxic agents into different, especially harmless or nontoxic compounds or breakdown products, in which case the catalytic and/or reactive particles or the catalytically active and/or reactive constituent or corresponding (active) component on which the particles are based, are retained in its or their original form and therefore not consumed, or at least substantially not consumed, during deployment as intended. Moreover, however, the term "catalytic and/or reactive" may in principle also relate to those qualities whereby not only the catalytic and/or reactive particles, or the catalytically active or reactive constituent or corresponding (active) component on which the particles are based, as such, but also the noxiant and/or poison agents are converted, for example, by chemical reaction between particle (constituent) or (active) component on the one hand and noxiant and/or poison agent on the other, especially irreversibly, into compounds which are nontoxic or less toxic by comparison with the noxiant and/or poison agent. In this case, the noxiant and/or poison agents may be present, for example, in the form of new chemical compounds, especially as a solid, preferably chemically bonded or, for example, as parts of reaction products in the form of less toxic or nontoxic compounds, as for example in the form of gases or vapors, which can be taken off accordingly. Furthermore, however, the invention does not rule out the possibility additionally of adsorptive effects occurring and/or being observed, where in this connection chemisorptive properties can also play a role. According to the invention, however, it is the catalytic and/or reactive properties that are in the foreground.

In accordance with the invention, moreover, a homogeneous, especially stochastic-homogeneous, furnishing of the unit of the invention with the catalytic and/or reactive particles is ensured. In this case, in particular, the catalytic and/or reactive particles may be applied or incorporated, especially integrated, on the surface and/or into the inner structures of the layer of adhesive, which is present in the form of a broken foam; surface occupation on the one hand and integration of the particles on the other may in accordance with the invention be realized jointly, or else independently of one another, as individual measures. In accordance with the invention, both in respect of the surface occupation and the incorporation or integration of the particles into the layer of adhesive, there is in particular a complete and, so to speak, gapless occupancy of the respective sections of the layer of adhesive by the catalytic and/or reactive particles on the basis of a random distribution of the particles, leading to outstanding protective properties on the part of the unit of the invention, since in this way the incidence of, so to speak, systemic penetration sites is prevented. In particular, the individual catalytic and/or reactive particles in the unit of the invention also have, in their multiplicity, optimum distances from one another, a factor which also improves the protective function. As a result of the broken foam structure, furthermore, the catalytic and/or reactive particles are ideally accessible by the noxiant and/or poison agents that are to be decomposed. In particular, there is none of the pore diffusion limitation that may occur in the case of microporous carrier components or carrier materials, since the structures in the broken foam are macroporous (macropores). In view of the improved distribution of the catalytic and/or reactive particles, with the ideal particle spacing, the design according to the invention also enables the use of particulate systems having relatively small particle sizes and diameters. In contrast to the prior art, it is possible with the method of the invention to realize a low areal loading, especially low mass-specific areal loading, in the case of small catalytic or reactive particles, and this also leads to improved economics or cost efficiency.

The term "stochastic-homogeneous" as used in the context of the present invention in particular in relation to the distribution or arrangement of the catalytic and/or reactive particles and/or the adsorbent particles, indicated later on, in and on the layer of adhesive and/or in and on the broken foam, should be interpreted in particular to mean that in principle there is a random or stochastic distribution or arrangement of the particles on and/or in the layer of adhesive in the form of a broken foam. It follows from this that the levels of the amount and/or concentration of particles on and/or in the layer of adhesive on which the unit of the invention is based are such that in turn there is a uniform or even coverage with the particles, thus preventing the incidence of penetration sites and/or sites with low particle quantities or without particles on and/or in the layer of adhesive. The result, consequently, is effective protection against noxiant and/or poison agents, so to speak, over the entire area of the unit or of the protective material according to the invention, since the random arrangement of the particles which are present in a multiplicity prevents penetration sites or regions with low particle quantities, or particle-free regions.

The catalytic or reactive unit provided in accordance with the invention also has outstanding tactile qualities, which coincides equally with the use of a sheetlike layer of adhesive based on a broken foam with the relevant fixing of relatively small particles. In this context, the protective material according to the invention also has outstanding properties in terms of its flexibility and its flexural behavior, especially since the cured and/or dried, broken adhesive polymer foam, or the corresponding layer of adhesive, is as such flexible or reversibly extensible (elastic). In accordance with the invention therefore, provision is made in particular for the cured and/or dried, broken adhesive polymer foam or the layer of adhesive to be flexible and/or elastic and/or reversibly extensible.

Moreover, the goal-directed use of a broken adhesive polymer foam also leads at the same time to the provision of a high air transmission rate on the part of the relevant layer of adhesive, accompanied by improved wear physiology as a consequence of the resulting high breathability of the protective material overall. In the context of the present invention, success has also been achieved in providing textile protective materials according to the invention which, relative to the prior art and in relation to the protection properties provided, possess a further reduced basis weight, since also by virtue of the outstanding fixability of the catalytic and/or reactive particles used on (meaning on and in) the broken foam, it is possible to use relatively small particle sizes in terms of the particles employed, and to use quantities of adhesive that are lower overall. The configuration, especially stochastic-homogeneous configuration, also makes it possible to reduce the quantity of catalytic and/or reactive particles themselves that are applied, and to do so without any overall reduction in the performance capability of the material. In this context, the thickness of the layer of adhesive, and hence the thickness of the resulting unit or of the protective material overall, can also be reduced.

An additional consequence resulting from the destroyed or broken or disintegrated foam is a multiplicity of apertures, pores, channels and/or openings in the destroyed or broken or disintegrated foam system of the layer of adhesive, which extend more particularly through the entire layer (thickness), leading to the air perviosity—created, so to speak, by the foam breaking and/or disintegrating—of the layer of adhesive and hence the unit of the invention overall, with the high availability of the catalytic and/or reactive particles mounted and/or fixed on the layer of adhesive.

As elaborated later on for the method of the invention, the procedure in accordance with the invention when producing the protective material having the broken foam structure is in particular to apply an initially intact and undried or not (fully) cured foam for providing the layer of adhesive to a textile carrier, where the inventively employed particles (i.e., in particular, catalytic and/or reactive particles on the one hand and any additional adsorbent particles employed on the other hand) may on the one hand be incorporated or introduced into the (foam) layer (by forming a suspension or immersion of the particles in the adhesive, more particularly the foamed adhesive, or into the adhesive polymer before application of the layer of adhesive to the carrier, for example) and/or, on the other hand, may be applied to the (foam) layer (for example, by scattering or printing onto the layer of adhesive following the application thereof to the carrier), with subsequent drying and/or curing of the layer of adhesive furnished with the particles, accompanied by breaking (open) or destruction or disintegration of the foam system, to give the broken adhesive polymer foam in the dried or cured state, where the layered, contiguous construction of the layer of adhesive as such is fundamentally retained.

The procedure of the invention further enables a homogeneous, extensive application of the catalytic and/or reactive particles, with simultaneously low basis weights for the applied adhesive polymer used for fixing.

The overall result is therefore a protective material or a unit of the invention with high air transmission rate, which by virtue of its high protective function with respect to noxiant and/or poison agents of the aforementioned kind, especially chemical and/or biological warfare agents, is also suitable for deployment in the area of NBC (nuclear biological, chemical) protection, especially since the unit of the invention also possesses corresponding protective properties in relation to nuclear or radioactive noxiant and/or poison agents, especially when adsorbent particles—based for example on activated carbon—are additionally used.

The catalytic and/or reactive unit of the invention is more particularly a functional construct composed of a plurality of components. The parent components of the unit of the invention are, in particular, a preferably textile carrier and also a layer of adhesive which is applied to the carrier and is present in a specific way, in the form of a dried and/or cured, especially crosslinked, broken adhesive polymer foam. As a further component, the unit of the invention also comprises catalytic and/or reactive particles, which in particular are applied to the layer of adhesive and/or incorporated or integrated into the layer of adhesive. Furthermore, in a non-limiting way, the catalytic and/or reactive unit, as recited further below, may comprise a multiplicity of adsorbent particles for additional provision of adsorptive properties, and may also, optionally, comprise at least one covering layer or at least one covering material.

The present invention will hereinafter be further described with reference to embodiments of the invention which, however, are nonlimiting:

The furnishing of the catalytic and/or reactive unit of the invention with the catalytic and/or reactive particles may, as noted above, take place in a diversity of ways. In particular, provision may be made in accordance with the invention for the catalytic and/or reactive particles to be disposed on and/or in the layer of adhesive, and/or incorporated or integrated at least partially into the layer of adhesive. In other words, therefore, provision may be made in accordance with the invention on the one hand for the catalytic and/or reactive particles to be disposed, as it were, two-dimensionally, especially on that side of the layer of adhesive that is facing away from the carrier. According to this arrangement, the catalytic and/or reactive particles in question may, so to speak, form a catalytic and/or reactive layer disposed on the layer of adhesive. On the other hand, moreover, provision may equally and independently be made, in accordance with the invention, for the catalytic and/or reactive particles to be incorporated or integrated into the layer of adhesive, resulting, so to speak, in a three-dimensional arrangement of the particles in the layer of adhesive.

In accordance with the invention, the respective arrangements of the catalytic and/or reactive particles, as described above, may be realized or present independently of one another or jointly; in other words, in accordance with the invention, catalytic and/or reactive units can be provided in which only the surface of the layer of adhesive or only the layer of adhesive, so to speak, in its interior or wherein the layer of adhesive in its interior and also its surface is/are furnished with the relevant particles. Accordingly, the invention can be used to provide units wherein the reactive particles are incorporated into the layer of adhesive (for example, by being mixed into the adhesive composition on which the layer of adhesive is based, in particular before that composition is applied to the carrier) and/or applied on the surface (e.g., by scattering or the like, in particular onto the as yet not (fully) cured layer of adhesive).

In accordance with the invention, the unit according to the invention may have a construction in the form of layers and/or plies. This construction is provided or configured in particular by the carrier on the one hand and the adhesive layer applied thereto, on the other. In this context, the carrier and the layer of adhesive may be arranged in the form of layers and/or in the form of plies.

According to the present aspect, the present invention also relates to a catalytic and/or reactive unit, especially as defined above, preferably in the form of a protective material having catalytic and/or reactive properties, especially having protective function toward chemical and/or biological noxiant and/or poison agents, preferably in the form of a textile protective filter material, where the unit comprises:
(a) a—especially an air-pervious—carrier, especially in the form of a textile carrier;
(b) a layer of adhesive applied to the carrier, where the layer of adhesive is an air-pervious and/or discontinuous layer based on a dried and/or cured, especially crosslinked, broken adhesive polymer foam; and
(c) a multiplicity of discrete catalytic and/or reactive particles, where the catalytic and/or reactive particles are durably joined to the carrier, especially by adhesive bonding, and/or are bonded to the carrier, where the joining and/or adhesive bonding is accomplished by the layer of adhesive applied to the carrier.

With regard to the catalytic and/or reactive particles as used in accordance with the invention, they may have a variety of configurations:

In particular it is the case in the context of the present invention that the catalytic and/or reactive particles comprise or consist of at least one catalytic and/or reactive component, especially a catalytic and/or reactive metal component (metal-containing component).

With regard to the amount or content of catalytic and/or reactive component in the catalytic and/or reactive particles used in accordance with the invention, it may in general vary within wide ranges: In this context, the catalytic and/or reactive particles may comprise the catalytic and/or reactive component in amounts in the range from 0.001 wt % to 100 wt %, especially in the range from 0.01 wt % to 95 wt %, preferably in the ranged from 0.1 wt % to 80 wt %, based on the catalytic and/or reactive particles. In particular, the particles may also comprise the catalytic and/or reactive component, as noted below, in pure form and/or in bulk and/or without carrier component, or as such, or consist thereof. Furthermore, the catalytic and/or reactive component in the particles may be present together with a carrier component and/or a binder, as also set out further below.

In particular, the catalytic and/or reactive component, especially the catalytic and/or reactive metal component, may comprise or consist of at least one metal compound comprising at least one metal, especially an inorganic and/or organic metal compound.

In accordance with the invention, in particular, the catalytic and/or reactive component, especially the catalytic and/or reactive metal component, comprises or consists of at least one metal.

In this regard, the metal may be present in elemental form and/or in ionic form and/or in charged form and/or in covalently or coordinately bonded form. In particular, the metal may be configured as a metal compound comprising the metal, especially an inorganic and/or organic metal compound comprising the metal.

In accordance with the invention, with regard to the catalytic and/or reactive properties of the particles, particularly good results are obtained if the metal is selected from the group of Mg, Ca, Sr, Ba, Sc, Y, Ti, Zr, Hf, Ce, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi, especially selected from the group of Fe, Ti, Zr, Mo, Mn, Ru, Co, Pt, Cu, Ag, Ni, Pd, Rh, Zn, Cd, Hg, Al, V, Sn, Pb and Bi. As noted above, the aforesaid specific metals or metal elements may be present as such (i.e., in elemental form or in ionic form or in charged form) or, in particular, in the form of a chemical compound, and the metals or the metal element may in that case be present preferably in covalently or coordinately bonded form or as a metal compound as such.

In accordance with the invention the metal may also be present as a metal compound. In that case the metal compound may in general be selected from the group of (i) metal salts, especially inorganic or organic metal salts, preferably inorganic metal salts; (ii) metal complexes, especially inorganic or organic metal complexes; (iii) metal clusters, especially inorganic or organic metal clusters; (iv) inorganic, organic and/or inorganic-organic polymers comprising metal and/or metal compound; (v) inorganic, organic or inorganic-organic hybrid polymers comprising metal and/or metal compound, especially inorganic-organic hybrid polymers comprising metal and/or metal compound, preferably ormocers; (vi) inorganic, organic or inorganic-organic, especially porous, framework materials comprising metal and/or metal compound, especially metal-organic framework materials and/or organic framework materials comprising metal and/or metal compound, preferably MOFs (Metal Organic Framework), COFs (Covalent Organic Framework), ZIFs (Zeolitic Imidazolate Framework), POMs (Polymer Organic Material) and OFCs, more preferably MOFs (Metal Organic Framework); and their combinations and also mixtures.

In the context of the present invention, it may in particular be the case that the catalytic and/or reactive component is used in bulk and/or in pure form and/or without carrier component and/or as such, and/or that the catalytic and/or reactive particles (4) consist of the catalytic and/or reactive component in bulk and/or in pure form and/or without carrier component and/or as such, and/or are formed thereof. This is connected with the advantage that low areal loadings can be realized for simultaneously high catalytic and/or reactive performance or activity for the particles.

According to a further embodiment according to the present invention, it may in particular be the case that the catalytic and/or reactive particles comprise or consist of at least one catalytic and/or reactive component, especially a catalytic and/or reactive metal component, especially together with a carrier component.

This embodiment according to the invention is focused in particular on the mounting or incorporation or arrangement of the catalytic and/or reactive component on carrier and/or framework component in order to form the catalytic and/or reactive particles (i.e., whereby the catalytic and/or reactive particles are formed from and/or comprise the carrier component and the catalytic and/or reactive component). In this case the catalytic and/or reactive component may be present, for example, incorporated into a carrier component or carrier substance, which in particular is porous and/or has inner voids.

With regard to the carrier component optionally employed in connection with the catalytic and/or reactive component, it may be the case according to the invention that the carrier component comprises or consists of at least one inorganic, organic or inorganic-organic binder and/or a carrier component or carrier substance, especially one which is porous and/or has inner voids.

In accordance with the invention, the catalytic and/or reactive component, especially the catalytic and/or reactive metal component, may in particular be chemically and/or physically fixed on the carrier component and/or incorporated therein. Moreover, the carrier component may be doped and/or impregnated with the catalytic and/or reactive component, especially with the catalytic and/or reactive metal component. Generally speaking, therefore, the catalytic and/or reactive component may be mounted on (meaning on and/or in) the carrier component for the purpose of forming the catalytic and/or reactive particles, especially on the basis of a chemical and/or physical fixing or doping and/or impregnation. In accordance with the invention, the binder, especially organic binder, and/or the carrier component may be a polymer, especially an organic polymer. In particular, the binder and/or the carrier component may be selected from the group of polyesters, polystyrenes, poly(meth)acrylates, polyacrylates, celluloses, polyamides, polyolefins, polyalkylene oxides and their mixtures and also combinations.

With regard in this context to the catalytic and/or reactive component, especially the catalytic and/or reactive metal component, it may according to the present embodiment comprise at least one metal and/or at least one metal compound comprising at least one metal, especially an inorganic and/or organic metal compound. In accordance with the invention, however, provision may in principle also be made for the catalytic and/or reactive component to comprise or consist of at least one lanthanide and/or at least one enzyme.

According to the present embodiment of the invention, it may in particular be the case that the catalytic and/or reactive particles comprise the catalytic and/or reactive component, especially the catalytic and/or reactive metal component, preferably the metal and/or the metal compound comprising at least one metal, in amounts in the range from 0.001 wt % to 100 wt %, especially in the range from 0.005 wt % to 99.5 wt %, preferably in the range from 0.01 wt % to 95 wt %, more preferably in the range from 0.05 wt % to 90 wt %, very preferably in the range from 0.1 wt % to 80 wt %, especially preferably in the range from 0.25 wt % to 50 wt %, more preferably in the range from 0.5 wt % to 30 wt %, more preferably still in the range from 1 wt % to 20 wt %, even more preferably in the range from 2 wt % to 10 wt %, based on the catalytic and/or reactive particles.

In this context, it may in particular be the case that the metal is present in elemental form and/or in ionic form and/or in charged form and/or in covalently or coordinately bonded form. In particular, moreover, the metal compound comprising the metal may be an inorganic and/or organic metal compound.

According to the embodiment of the invention whereby the catalytic and/or reactive component is present in particular together with a carrier component, it is preferred in accordance with the invention if the catalytic and/or reactive component is selected from the group of (i) metal salts, especially inorganic or organic metal salts, preferably inorganic metal salts; (ii) metal complexes, especially inorganic or organic metal complexes; (iii) metal clusters, especially inorganic or organic metal clusters; (iv) inorganic, organic and/or inorganic-organic polymers comprising metal and/or metal compound; (v) inorganic, organic or inorganic-organic hybrid polymers comprising metal and/or metal compound, especially inorganic-organic hybrid polymers comprising metal and/or metal compound, preferably ormocers; (vi) inorganic, organic or inorganic-organic, especially porous, framework materials comprising metal and/or metal compound, especially metal-organic framework materials and/or organic framework materials comprising metal and/or metal compound, preferably MOFs (Metal Organic Framework), COFs (Covalent Organic Framework), ZIFs (Zeolitic Imidazolate Framework), POMs (Polymer Organic Material) and OFCs, more preferably MOFs (Metal Organic Framework); and their combinations and also mixtures.

In particular, the metal may also comprise or consist of a metal in a positive oxidation state, especially in the form of a metal cation. In this connection, the oxidation state of the metal may be in the range from +I to +VII, especially in the range from +I to +IV, preferably in the range from +I to +III. In accordance with the invention it is preferred if the oxidation state of the metal is +I or +II. The metal may also equally be present in the zero oxidation state.

In particular the metal in this case may be selected from the main or transition groups of the periodic table of the elements. Furthermore, the metal may also be a lanthanide.

In accordance with the invention it is preferred if the metal is selected from elements of groups 1 to 15 of the periodic table of the elements, especially from elements of groups 4, 6, 8 and 10 to 15 of the periodic table of the elements. The aforementioned group specifications are based on the valid IUPAC nomenclature, this also applying to the details below concerning further group specifications.

In particular in accordance with the present embodiment the metal may in particular be selected from the group of Mg, Ca, Sr, Ba, Sc, Y, Ti, Zr, Hf, Ce, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi, especially selected from the group of Fe, Ti, Zr, Mo, Mn, Ru, Co, Pt, Cu, Ag, Ni, Pd, Rh, Zn, Cd, Hg, Al, V, Sn, Pb and Bi.

In accordance with the invention, the catalytic and/or reactive component, especially for purposes of introduction into a carrier component for providing the catalytic and/or reactive particles, may for example first be used in the form of a dispersion and transferred into the voids in the carrier component or carrier substance, possibly resulting in chemical and/or physical fixing and/or incorporation of the catalytic and/or reactive component in the voids. The dispersion medium may subsequently be removed, to give the catalytic and/or reactive component fixed on the carrier component and/or incorporated therein, allowing corresponding catalytic and/or reactive particles to be obtained.

For this purpose as well, provision may be made in accordance with the invention for the catalytic and/or reactive, especially the catalytic and/or reactive metal component, preferably the metal and/or the metal compound comprising at least one metal to be dispersible in a dispersion medium which especially is aqueous and/or especially is aqueously based.

In accordance with the invention, for example, it may be the case that the catalytic and/or reactive component, especially the catalytic and/or reactive metal component, preferably the metal and/or the metal compound comprising at least one metal, comprises or consists of a metal salt or metal oxide, especially a metal salt. In this respect, the catalytic and/or reactive component may be especially chemically and/or physically fixed on or incorporated in the carrier component, especially the aforementioned carrier component, especially in the form of a carrier component or carrier substance which is porous and/or has inner voids.

In this context, the catalytic and/or reactive component, especially the catalytic and/or reactive metal component, preferably the metal and/or the metal compound comprising the at least one metal, suitable comprises organic or inorganic metal salts. In this connection, the salt may be selected from the group of halide salts, sulfates, sulfides, sulfites, nitrates, nitrites, phosphates, phosphides, phosphites, carbamates, alkoxides and carboxylic acid salts, especially halide salts and carboxylic salts.

In this regard, the catalytic and/or reactive component, especially the catalytic and/or reactive metal component, preferably the metal and/or the metal compound comprising at least one metal, may comprise or consist of a metal halide, especially a fluoride, chloride, bromide or iodide, preferably chloride, and/or a metal carboxylic acid salt, especially metal acetate.

In accordance with the invention, particularly highly performing catalytic and/or reactive components are provided here if the catalytic and/or reactive component, especially the catalytic and/or reactive metal component, preferably the metal and/or the metal compound comprising at least one metal, is selected from the group of palladium chloride, hexachloroplatinic acid, ruthenium chloride, copper chloride, iron chloride, vanadium chloride and lead chloride, especially palladium chloride, hexachloroplatinic acid and ruthenium chloride.

Generally speaking, in accordance with this embodiment in the context of the present invention, it may therefore be the case that the catalytic and/or reactive component on the one hand and the carrier component on the other hand form the catalytic and/or reactive particles as such that are used in accordance with the invention.

According to a further embodiment of the invention, the catalytic and/or reactive component may comprise or consist of a specific hybrid polymer comprising metal and/or metal compounds, this polymer being based, for example, on ormocers.

In particular, in this context, the catalytic and/or reactive component, preferably the metal and/or the metal compound comprising at least one metal, may comprise or consist of at least one metal-containing polymer, especially metal-containing inorganic, organic and/or inorganic-organic polymer, and/or a metal-containing hybrid polymer, especially metal-containing inorganic, organic, inorganic-organic and/or organometallic hybrid polymer, preferably ormocer. In this regard, it is an advantage in the context of the present invention if the metal of the metal-containing polymer and/or of the metal-containing hybrid polymer is selected from the group of Cu, Ag, Cd, Pt, Pd, Rh, Zn, Hg, Zr and Al and also combinations thereof.

In this context, the metal-containing polymer and/or the metal-containing hybrid polymer may comprise ceramic constituents and/or silicate-based constituents, and/or organic constituents, especially organic crosslinks and/or organic functional groups. In accordance with the invention, the metal-containing polymer and/or metal-containing hybrid polymer may be produced by gel/sol methods.

Moreover, the metal-containing polymer and/or metal-containing hybrid polymer may comprise both inorganic and organic structural units.

In this respect, the metal-containing polymer and/or the metal-containing hybrid polymer may comprise an inorganic silicate network. In particular, the inorganic silicate network may comprise organic groups and/or organic crosslinks. In particular, the metal-containing polymer and/or the metal-containing hybrid polymer may comprise silicon alkoxides and/or (Si—O—Si) units. In particular, the silicon alkoxides may be crosslinked by hydrolysis and condensation. Moreover, it may be the case in accordance with the invention that the metal-containing polymer and/or the metal-containing hybrid polymer comprises organically modified silicon alkoxides and/or (Si—O—Si) units. In this context, the organically modified silicon alkoxides and/or the (Si—O—Si) units may comprise at least one organic radical, bonded preferably on the silicon atom. In this regard, the organic radical may be a polymerizable organic radical, preferably selected from the group of acryloyl, vinyl and epoxy groups.

The metal-containing polymer and/or the metal-containing hybrid polymer may further comprise silicon alkoxides and/or (Si—O—Si) units that are modified with functional, preferably nonpolymerizable, organic groups. In this respect, the functional, preferably nonpolymerizable groups may comprise the metal. The metal may equally be a constituent of the functional, preferably nonpolymerizable groups.

Furthermore, the metal-containing polymer and/or the metal-containing hybrid polymer may comprise not only silicon alkoxides but also heteroatoms, especially in the form of and/or for the formation of metal alkoxides comprising the metal. For this purpose, the metal and/or the metal alkoxides, especially the metal alkoxides, may be co-condensed with the silicon alkoxides.

As noted above, according to this embodiment of the invention, the metal-containing polymer and/or the metal-containing hybrid polymer may especially be an ormocer. In this connection, the metal-containing polymer and/or the catalytic and/or reactive component may comprise or consist of an ormocer.

Ormocer® is a registered trademark of Fraunhofer Gesellschaft zur Förderung der angewandten Forschung e.V., Munich.

With further regard to the metal-containing polymer and/or the metal-containing hybrid polymer especially in the form of ormocers, the polymer may be doped and/or impregnated with the metal. The metal may equally be bonded chemically and/or physically to the metal-containing polymer and/or metal-containing hybrid polymer. In this respect, the metal may be present in ionic form and/or in the form of a metal salt.

The inorganic and/or organic hybrid polymers used in accordance with the invention, especially in the form of ormocers, are suitable, for this reason as well, for use in the context of the present invention, since through the targeted selection and/or variation of the respective network constituents, it is possible to carry out targeted control or setting of the physical and/or chemical polymer properties and/or parameters. To put it more precisely, the properties of the inorganic-organic hybrid polymers, especially of the ormocers, may be accomplished, for example, on the basis of the starting materials, the reaction conditions, the inorganic polycondensation reaction, and also through the control of linking reactions leading to the construction of the organic network. By these means it is possible, so to speak, to tailor specific inorganic-organic polymers, in respect, for example, of targeted surface area enlargements with enhanced catalytic and/or reactive properties.

Moreover, the metal-containing polymer and/or the metal-containing hybrid polymer may be present in the form of polymer particles, especially polymer nanoparticles. In this connection, the polymer particles may have a particle size, especially a particle diameter, in the range from 0.1 nm to 1000 nm, especially in the range from 5 nm to 700 nm, preferably in the range from 50 nm to 500 nm. In this regard, at least 80%, especially at least 90%, preferably at least 95% of the polymer particles, based on the total number of polymer particles, ought to have particle sizes, especially particle diameters, within the aforesaid ranges. In particular, the polymer particles may have a mean particle size (D50), especially a mean particle diameter (D50), in the range from 0.1 nm to 1000 nm, especially in the range from 5 nm to 700 nm, preferably in the range from 50 nm to 500 nm.

In this context, it may be the case in accordance with the invention that the catalytic and/or reactive particles comprise the aforesaid polymer particles and/or the catalytic and/or reactive component in the form of the aforesaid polymer particles and/or the metal-containing polymer and/or the metal-containing hybrid polymer as such in particular in the form of one or more ormocers together with at least one carrier component. In this regard, the polymer particles and/or the metal-containing polymer and/or the metal-containing hybrid polymer may be chemically and/or physically fixed on the carrier component and/or incorporated therein.

Equally, the catalytic and/or reactive particles may also be formed of and/or consist of the aforesaid polymer particles and/or the catalytic and/or reactive component in the form of the aforesaid polymer particles as such. The aforesaid polymer particles based on the metal-containing polymer and/or metal-containing hybrid polymer may therefore be used supported or unsupported as catalytic and/or reactive particles as such.

In general in accordance with the invention, therefore, it may be the case that the catalytic and/or reactive particles based on the metal-containing polymer and/or on the metal-containing hybrid polymer are configured in particular in the form of ormocer(s). In particular, the catalytic and/or reactive particles may comprise or consist of, especially consist of, the metal-containing polymer and/or the metal-containing hybrid polymer especially in the form of ormocer(s). In particular, therefore, it may be the case that the catalytic and/or reactive particles are formed and/or consist of the catalytic and/or reactive component in the form of the metal-containing polymer and/or the metal-containing hybrid polymer, especially in the form of ormocer(s).

Generally speaking, the metal-containing polymer and/or the metal-containing hybrid polymer, especially in the form of the inorganic-organic hybrid polymer, may be produced by a two-stage process. For this purpose in a first step, the inorganic structural units may be formed by hydrolysis and condensation of silicon alkoxides, and in a subsequent second step, the inorganic structural units may be polymerized and/or crosslinked, by polymerization and/or crosslinking especially of the organic silicon alkoxides, in order to construct the organic structural units.

Furthermore, for further details concerning the catalytic and/or reactive particles which can be used in accordance with the invention, especially based on hybrid polymers, especially ormocers, reference may be made to European patent application EP 1 738 823 A2 and also to the parallel German patent application DE 10 2005 040 189 A1 and to the parallel US patent application as per U.S. Pat. No. 7,759,274 A, the respective disclosure content of which is hereby incorporated in its entirety by reference.

According to a further, inventively preferred embodiment, the catalytic and/or reactive particles may be configured on the basis of framework materials, especially porous framework materials, that comprise metals and/or metal compounds, and more particularly on the basis of MOF materials (Metal Organic Framework):

In this context, the catalytic and/or reactive component, preferably the metal and/or the metal compound comprising at least one metal, may comprise or consist of at least one metal-containing inorganic, organic or inorganic-organic, especially porous, framework material, preferably a metal-containing organic framework material and/or a metal-organic framework material, more preferably a MOF material (Metal Organic Framework).

Generally speaking, the MOF materials used in accordance with the invention have high catalytic and/or reactive performance capability. Moreover, with the MOF materials used in accordance with the invention, processability in media, especially in aqueous or aqueously based and/or water-containing media, is good.

In particular, the metal-containing inorganic, organic or inorganic-organic framework material, more preferably MOF material (Metal Organic Framework), may comprise or consist of repeating structural units based in each case on at least on metal, especially metal atom or metal ion, especially as defined above, on the one hand, and at least one at least bidentate and/or bridging organic ligand, especially as defined hereinafter, on the other.

Moreover, the metal-containing inorganic, organic or inorganic-organic framework material, more preferably MOF material (Metal Organic Framework), may comprise at least one metal, especially metal atom or metal ion, especially as presently defined.

In this context, the metal may especially be selected from elements of groups 1 to 14 of the periodic table of the elements, especially from elements of groups 4, 8 and 11 to 13 of the periodic table of the elements. The metal may especially be selected from the group of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi, especially from the group of Ti, Zn, Cu, Zr, Ni, Pd, Pt, Ru, Th, Fe, Mn, Ag, Al and Co, preferably from the group of Ti, Cu, Zr, Fe, Co, Zn, Mn, Al and Ag, more preferably from the group of Cu, Fe, Al and Zn. In accordance with the invention, metals preferably employed are those which, especially in combination with corresponding ligands, lead to MOF materials having further-increased stability to water vapor and/or moisture and/or hydrolysis and/or with improved processability in media, especially aqueous or aqueously based and/or water-containing media.

Furthermore, the metal-containing inorganic, organic or inorganic-organic framework material, more preferably MOF material (Metal Organic Framework), may comprise at least one at least bidentate and/or bridging organic ligand. In particular, the ligand may have at least one functional group which is capable of forming at least two coordinate bonds to a metal, especially metal atom or metal ion, especially as defined above, and/or of forming one coordinate bond each to two or more metals, especially metal atoms or metal ions, especially as defined above, identically or differently, especially where the functional group of the ligand comprises at least one heteroatom, preferably from the group of N, O, S, B, P, Si and Al, more preferably N, O and S. In this context, the ligand may be selected from at least dibasic organic acids, especially dicarboxylic acids, tricarboxylic acids, tetracarboxylic acids and mixtures thereof, more preferably optionally at least monosubstituted aromatic, especially mono-, di-, tri-, tetra- or higher-polycyclic aromatic dicarboxylic, tricarboxylic or tetracarboxylic acids. In this context, each of the cyclic ring systems may comprise at least one heteroatom, identically or differently, such as, in particular, N, O, S, B, P, Si and/or Al, preferably N, S and/or O. Moreover, the metal-containing inorganic, organic or inorganic-organic framework material, more preferably MOF material (Metal Organic Framework), may be furnished, especially doped, with at least one further metal, selected from the group of the precious metals, especially selected from the group of Rt, Rh, Pt, Ag, Au and their combinations. In this case the amount of the further metal may be in the range from 0.01 wt % to 15 wt %, especially in the range from 0.05 wt % to 10 wt %, preferably in the range from 0.1 wt % to 8 wt %, based on the metal-containing inorganic, organic or inorganic-organic framework material. By these means it is possible to achieve a further boost in the catalytic and/or reactive properties.

The metal-containing inorganic, organic or inorganic-organic framework material, more preferably MOF material (Metal Organic Framework), may also be present in crystalline form. In this case the degree of crystallinity may be at least 60%, especially at least 70%, preferably at least 80%, more preferably at least 90%, very preferably at least 95%, especially preferably at least 99% or more.

In accordance with the invention, moreover, it may be the case that the metal-containing inorganic, organic or inorganic-organic framework material, more preferably MOF material (Metal Organic Framework), is present in activated form, preferably by heat treatment, especially at temperatures in the range from 90° C. to 300° C., preferably 100° C. to 250° C., more preferably 110° C. to 220° C.

Moreover, the catalytic and/or reactive particles may consist of the at least one metal-containing inorganic, organic or inorganic-organic framework material, more preferably the MOF material (Metal Organic Framework), as catalytic and/or reactive component. In other words, the framework materials, present in particular in particulate form, may form the particles as such. In other words, it may be the case in accordance with the invention that the catalytic and/or reactive particles consist of a catalytic and/or reactive component in the form of the aforesaid framework material, especially MOF material. The aforesaid framework materials, especially MOF materials, may therefore be used either supported (i.e., in combination with a carrier component and/or a binder) or else, preferably, unsupported (i.e., as such and/or without carrier component and/or without binder) and/or in bulk or in pure form and/or as a pure substance, preferably unsupported, and/or in the form of catalytic and/or reactive particles as such.

In accordance with the invention, it may be the case in particular that the catalytic and/or reactive particles are configured on the basis of the at least one metal-containing inorganic, organic or inorganic-organic framework material, more preferably MOF material (Metal Organic Framework). In particular, the catalytic and/or reactive particles may comprise or consist of, especially consist of, the metal-containing inorganic, organic or inorganic-organic, especially porous, framework material, more preferably the MOF material (Metal Organic Framework). In particular, therefore, it may be the case that the catalytic and/or reactive particles are formed by the catalytic and/or reactive component in the form of the metal-containing inorganic, organic or inorganic-organic, especially porous, framework material, more preferably of the MOF material (Metal Organic Framework).

In this context, it may be the case in accordance with the invention that the catalytic and/or reactive particles comprise or consist of the at least one metal-containing inorganic, organic or inorganic-organic framework material, more preferably the MOF material (Metal Organic Framework), in bulk and/or as such.

In particular it is possible for the catalytic and/or reactive particles to comprise or consist of the at least one metal-containing inorganic, organic or inorganic-organic framework material, more preferably the MOF material (Metal Organic Framework), consequently in bulk and/or in pure form and/or without carrier component and/or as such, especially consist thereof. In this context it is possible for the catalytic and/or reactive particles to consist of and/or to be formed of the catalytic and/or reactive component in the form of the at least one metal-containing inorganic, organic or inorganic-organic framework material, more preferably the MOF material (Metal Organic Framework), in bulk and/or in pure form and/or without carrier component and/or as such. In this respect it is possible for the catalytic and/or reactive particles (4) to have a mean particle size (D50), especially a mean particle diameter (D50), in the range from 0.0001 mm to 1 mm, especially in the range from 0.0005 mm to 0.5 mm, preferably in the range from 0.001 mm to 0.3 mm, more preferably in the range from 0.003 mm to 0.2 mm, very preferably in the range from 0.005 mm to 0.1 mm. Particles of this kind lend themselves particularly well to incorporation or integration, particularly into the layer of adhesive, and at the same time outstanding catalytic and/or reactive properties are provided.

Moreover, the metal-containing inorganic, organic or inorganic-organic framework material, more preferably the MOF material (Metal Organic Framework), may in principle, however, also be present in a form in which it is introduced in a carrier component, especially in an inorganic, organic or inorganic-organic binder, or in a carrier component or carrier substance which in particular is porous and/or has inner voids.

For example it is possible for the catalytic and/or reactive particles to comprise the metal-containing inorganic, organic or inorganic-organic framework material, more preferably MOF material (Metal Organic Framework), on the one hand, and the carrier component, on the other hand, in a framework material/carrier component quantity ratio, especially framework material/carrier component weight ratio, in the range from 1:0.5 to 15:1, especially in the range from 1:1 to 10:1, preferably in the range from 1.2:1 to 3:1, more preferably in the range from 1.4:1 to 2.5:1, and to comprise them especially in a ratio of more than 1 (>1, i.e., excluding 1).

The carrier component used in this context may comprise or consist of at least one organic binder, especially an organic polymer. In this context, the organic binder and/or the carrier component may be selected from the group of polyesters, polystyrenes, poly(meth)acrylates, polyacrylates, celluloses, polyamides, polyolefins, polyalkylene oxides and their combinations and mixtures.

The MOF materials which can be used in the context of the present invention are notable for outstanding catalytic and/or reactive properties, which can be tailored before the respective intended deployment or application. Moreover, a further advantage of using MOF materials is that they can be employed as such or in pure form and hence without a further carrier component or binder, in the form of catalytic and/or reactive particles as such, particularly as regards incorporation or integration of the corresponding particles into the layer of adhesive.

Furthermore, regarding further details of the catalytic and/or reactive particles that can be employed in accordance with the invention, especially particles based on MOF materials, reference may be made to international patent application WO 2009/056184 A1 and also the parallel German patent application DE 10 2008 005 218 A1 and to the parallel US patent application as per U.S. Pat. No. 2,011,010 826 A, the respective disclosure content of which is hereby included in its entirety by reference.

Furthermore, according to another embodiment of the present invention, for the inventively employed catalytic and/or reactive particles and/or the catalytic and/or reactive component on which the particles are based, it is also possible to use catalytic and/or reactive systems based on what are known as Ionic Liquids (ILs), as described in particular in international patent application WO 2013/023715 A1 and also in the parallel German patent application DE 10 2011 114 133 A1 or the parallel US patent application as per U.S. Pat. No. 2,014,302 981 A, the respective disclosure content of which is hereby incorporated in its entirety by reference.

Furthermore, in addition to the statements above, and in accordance with an in turn further embodiment of the present invention, the catalytic and/or reactive particles may be configured on the basis of specific impregnations, such as those known as ASZM-TEDA impregnations, especially where the catalytic and/or reactive component may in turn be fixed on a carrier component and/or on a binder for the formation of the particles. Examples of carrier components contemplated in this respect likewise include inorganic, organic or inorganic-organic binders, with the binders in question in particular being porous and/or having inner voids.

The catalytic and/or reactive component, preferably the metal and/or the metal compound comprising at least one metal, may comprise or consist of a metal selected from the group of Cu, Ag, Zn and Mo and/or their compounds. In particular, moreover, the catalytic and/or reactive component may comprise at least one, preferably bicyclic, tertiary amine, especially triethylenediamine.

Moreover, the catalytic and/or reactive component, preferably the metal and/or the metal compound comprising at least one metal, may comprise at least two of the metals from the group of Cu, Ag, Zn and Mo and/or their compounds, optionally together with triethylenediamine (TEDA) and/or an organic acid and/or sulfuric acid and/or sulfuric acid salts.

In particular, the catalytic and/or reactive component, preferably the metal and/or the metal compound comprising at least one metal, may be configured on the basis of, or comprise, a combination of (i) copper, especially copper(II) carbonate ($CuCO_3$); (ii) silver, especially elemental silver; (iii) zinc, especially zinc(II) carbonate ($ZnCO_3$); (iv) molybdenum, especially ammonium dimolybdate.

In accordance with the invention, therefore, it is also possible for so-called ASZM-TEDA impregnations to be used.

With regard, further, to the physical configuration and/or shaping of the catalytic and/or reactive particles used in accordance with the invention, provision may be made in accordance with the invention for the catalytic and/or reactive particles to be granular or spherical, especially spherical. By this means it is possible to make corresponding improvements to the furnishing of the unit of the invention with the particles in question, since the granular and/or spherical particles, for example, have better bulk behavior and, moreover, can more effectively be incorporated into the material or applied thereon (i.e., with homogeneous loading and/or occupation).

Furthermore, the particle size of the inventively employed catalytic and/or reactive particles may vary within wide ranges. In accordance with the invention, however, it is of advantage if the catalytic and/or reactive particles have a particle size, especially a particle diameter, in the range from 0.0001 mm to 2.5 mm, especially in the range from 0.0005 mm to 2 mm, preferably in the range from 0.001 mm to 1.5 mm, more preferably in the range from 0.003 mm to 1 mm, very preferably in the range from 0.005 mm to 0.8 mm, especially preferably in the range from 0.01 mm to 0.5 mm. In this context at least 80%, especially at least 90%, preferably at least 95% of the catalytic and/or reactive particles based on the total number of catalytic and/or reactive particles, ought to have particle sizes, especially particle diameters, in the aforesaid ranges.

In particular, the catalytic and/or reactive particles may have a mean particle size (D50), especially a mean particle diameter (D50), in the range from 0.0001 mm to 2.5 mm, especially in the range from 0.0005 mm to 2 mm, preferably in the range from 0.001 mm to 1.5 mm, more preferably in the range from 0.003 mm to 1 mm, very preferably in the range from 0.005 mm to 0.8 mm, especially preferably in the range from 0.01 mm to 0.5 mm.

With regard to the embodiment of the invention whereby the catalytic and/or reactive particles are incorporated and/or integrated into the layer of adhesive, particularly good results are achieved in this respect if the catalytic and/or reactive particles used have a relatively small particle size or relatively small mean particular diameter. Hence it is of advantage in this respect, in the context of the present invention, if the catalytic and/or reactive particles have a mean particle size (D50), especially a mean particle diameter (D50), in the range from 0.0001 mm to 1 mm, especially in the range from 0.0005 mm to 0.5 mm, preferably in the range from 0.001 mm to 0.1 mm. These relatively small particles can be incorporated or integrated particularly well into the foam structure.

For the embodiment of the invention whereby the catalytic and/or reactive particles are disposed on the layer of adhesive, conversely, it has proven especially advantageous if the particles employed in this context have a relatively large mean particle size and/or relatively large mean particle diameter. It is especially advantageous in accordance with the invention if the catalytic and/or reactive particles have a mean particle size (D50), especially a mean particle diameter (D50), in the range from 0.001 mm to 2.5 mm, especially in the range from 0.002 mm to 2 mm, preferably in the range from 0.003 mm to 1 mm, more preferably in the range from 0.005 mm to 0.5 mm. This prevents excessive sinking of the particles into the layer of adhesive.

With regard to the methods or measurement techniques on which the particle size determinations are based, reference may be made to statements later on.

In general, the catalytic and/or reactive particles, in order to ensure an efficient protective function with respect to the noxiant and/or poison agents in question, may be used in an amount in the range from 5 $g/m^2$ to 150 $g/m^2$, especially 10 $g/m^2$ to 100 $g/m^2$, preferably 15 $g/m^2$ to 75 $g/m^2$, more preferably 20 $g/m^2$ to 50 $g/m^2$. In other words, the unit of the invention may comprise the catalytic and/or reactive particles in an amount in the range from 5 $g/m^2$ to 150 $g/m^2$, especially 10 $g/m^2$ to 100 $g/m^2$, preferably 15 $g/m^2$ to 75 $g/m^2$, more preferably 20 $g/m^2$ to 50 $g/m^2$. The aforesaid quantity figures are based in particular on the area of the unit of the invention and/or of the carrier, especially textile carrier, on which the unit is based.

In accordance with the invention, the catalytic and/or reactive particles may be disposed on and/or in the layer of adhesive in a random and/or stochastic way and/or with a stochastic-homogeneous disposition. In particular, the catalytic and/or reactive particles may be incorporated and/or integrated at least partially into the layer of adhesive in a random or stochastic way or in a stochastic-homogeneous manner. In this regard, reference may also be made to statements above.

The catalytic and/or reactive particles may be disposed and/or present at least substantially completely or else at least partially on the layer of adhesive. In this respect, at least 50%, especially at least 70%, preferably at least 90%, more preferably at least 95%, of the catalytic and/or reactive particles, based on the total number of catalytic and/or reactive particles, may be disposed on and/or present on the layer of adhesive. The aforesaid percentages are based on the total number of catalytic and/or reactive particles in the unit of the invention. In this context, the catalytic and/or reactive particles disposed, in particular, on that side or surface of the layer of adhesive that is facing away from the carrier may form a catalytic and/or reactive layer within the unit of the invention.

In accordance with the invention it may also be the case that the catalytic and/or reactive particles are disposed or present at least substantially completely or else at least partially in the layer of adhesive, and especially are incorporated and/or integrated into the layer of adhesive. In this context, at least 50%, especially at least 70%, preferably at least 90%, more preferably at least 95%, of the catalytic and/or reactive particles, based on the total number of the catalytic and/or reactive particles, may be disposed or present in the layer of adhesive, especially incorporated or integrated into the layer of adhesive. In this case the catalytic and/or reactive particles are mounted or fixed in particular on the respective structures of the broken foam, as for example on the destroyed walls, lamellae, struts of the adhesive polymer on which the broken foam is based.

In the context of the present invention it has proven advantageous here if the catalytic and/or reactive particles disposed or present on the layer of adhesive have a larger mean particle size (D50), especially a larger mean particle diameter (D50), than the catalytic and/or reactive particles disposed or present at least substantially completely or else at least partially in the layer of adhesive, especially those integrated and/or incorporated into the layer of adhesive.

In this context, the ratio of the mean particle size (D50), especially the mean particle diameter (D50), of the catalytic and/or reactive particles disposed and/or present at least substantially completely or else at least partially on the layer of adhesive, on the one hand, to the mean particle size (D50), especially the mean particle diameter (D50), of the catalytic and/or reactive particles disposed and/or present in the layer of adhesive, especially incorporated and/or integrated into the layer of adhesive, at least substantially completely or else at least partially, on the other hand [particle size (D50), especially mean particle diameter (D50), of the applied catalytic and/or reactive particles:particle size (D50), especially mean particle diameter (D50), of the incorporated catalytic and/or reactive particles] may be in the range from 100:1 to 1:1, especially in the range from 50:1 to 1.05:1, preferably in the range from 40:1 to 1.1:1, more preferably in the range from 30:1 to 1.5:1, very preferably in the range from 20:1 to 2:1, especially preferably in the range from 10:1 to 3:1.

According to this inventively preferred embodiment, therefore, the relatively large catalytic and/or reactive particles may be located primarily on or in the region of the surface of the layer of adhesive, whereas the relatively small particles are disposed or integrated primarily in the layer of adhesive.

According to a further inventive embodiment, moreover, it may be the case that the catalytic and/or reactive particles are used together and/or in combination with a multiplicity of discrete adsorbent particles, especially activated carbon particles. In this context, the unit according to the invention may therefore comprise a multiplicity of discrete adsorbent particles, especially activated carbon particles. In particular, the carrier may be charged and/or furnished and/or provided with a multiplicity of discrete adsorbent particles, especially activated carbon particles, where the adsorbent particles are durably joined to the carrier, especially by adhesive bonding, and/or are bonded to the carrier, where the joining and/or adhesive bonding is accomplished and/or brought about by the layer of adhesive applied to the carrier. The adsorbent particles here may be disposed on and/or in the layer of adhesive and/or incorporated or integrated at least partially into the layer of adhesive, preferably disposed in the layer of adhesive and/or incorporated or integrated at least partially into the layer of adhesive.

By this means it is possible in a targeted way to supplement the catalytic and reactive properties of the unit of the invention with adsorptive properties. In this case, in the context of the present invention, the case in particular is such that the catalytic and/or reactive particles on the one hand and the adsorbent particles, especially based on activated carbon particles, on the other hand supplement one another functionally in terms of rendering noxiant and/or poison agents harmless, with the components in question, in their mode of action, boosting one another beyond the sum of the individual measures. In particular, without wishing to be limited to this theory, there is mutual relieving of catalytic and/or reactive system on the one hand and adsorptive system on the other. In the case of high noxiant loading, in particular, noxiant and/or poison agents possibly desorbed by the adsorbent particles may also, in particular, be broken down subsequently by the catalytic and/or reactive particles.

Regarding, furthermore, the adsorbent particles in the form of activated carbon or activated carbon particles that can be used in the context of the present invention in addition to the catalytic and/or reactive particles (and also referred to below only as activated carbon), the parameters presently recited can be determined using standardized or explicitly reported methods of determination, or using determination techniques that are familiar per se to the skilled person. Particularly the parameter data concerning the characterization of the porosity of the pore size distribution and other adsorptive properties each derive in general from the corresponding nitrogen sorption isotherms of the activated carbon in question and/or of the products measured. Moreover, the pore distribution, particularly also with regard to the micropore content in relation to the overall pore volume, may be determined on the basis of DIN 66135-1.

In accordance with the invention it is of advantage if the adsorbent particles, especially activated carbon particles, are granular and/or spherical, especially spherical. In particular it is possible for the adsorbent particles, especially activated carbon particles, to have a particle size, especially a particle diameter, in the range from 0.005 mm to 2.5 mm, preferably 0.01 mm to 2 mm, more preferably 0.015 mm to 0.5 mm, very preferably 0.02 mm to 0.3 mm, especially preferably 0.03 mm to 0.15 mm. In this respect at least 80%, especially at least 90%, preferably at least 95% of the adsorbent particles, based on the total number of adsorbent particles, ought to have particle sizes, especially particle diameters, in the aforesaid ranges.

Moreover, the adsorbent particles, especially activated carbon particles, ought to have a mean particle size (D50), especially a mean particle diameter (D50), in the range from 0.005 mm to 2.5 mm, preferably 0.01 mm to 2 mm, more preferably 0.015 mm to 0.5 mm, very preferably 0.02 mm to 0.3 mm, especially preferably 0.03 mm to 0.15 mm.

With regard to the inventive embodiment of the introduction and/or integration of the adsorbent particles into the layer of adhesive or into the broken foam on which the layer of adhesive is based, it has proven advantageous in accordance with the invention here as well if in this regard relatively small particle sizes are used. In this context the adsorbent particles, especially activated carbon particles, may have a mean particle size (D50), especially a mean particle diameter (D50), in the range from 0.005 mm to 1 mm, especially in the range from 0.01 mm to 0.5 mm, preferably in the range from 0.02 mm to 0.1 mm.

With regard, moreover, to the inventive embodiment with the application of the adsorbent particles to the layer of adhesive, it has proven advantageous in accordance with the invention, correspondingly, if for this purpose relatively large adsorbent particles are used. In this context, the adsorbent particles may have a mean particle size (D50), especially a mean particle diameter (D50), in the range from 0.01 mm to 2.5 mm, especially in the range from 0.02 mm to 2.0 mm, preferably in the range from 0.03 mm to 1.0 mm, more preferably in the range from 0.03 mm to 0.5 mm.

With regard to the methods and measurement techniques on which the particle size determinations are based, reference may be made to statements later on below.

In accordance with the invention the adsorbent particles, especially activated carbon particles, may be used in an amount in the range from 5 g/m$^2$ to 150 g/m$^2$, especially 10 g/m$^2$ to 100 g/m$^2$, preferably 15 g/m$^2$ to 75 g/m$^2$, more preferably 20 g/m$^2$ to 50 g/m$^2$. In particular it is possible for the unit of the invention to comprise the adsorbent particles, especially activated carbon particles, in an amount in the range from 5 g/m$^2$ to 150 g/m$^2$, especially 10 g/m$^2$ to 100 g/m$^2$, preferably 15 g/m$^2$ to 75 g/m$^2$, more preferably 20 g/m$^2$ to 50 g/m$^2$.

The adsorbent particles, especially activated carbon particles, may, as noted above, be mounted and/or disposed on and/or in the layer of adhesive, especially in random and/or stochastic disposition and/or in stochastic-homogeneous disposition, and/or may be incorporated and/or integrated at least partially into the layer of adhesive, especially in random and/or stochastic disposition and/or stochastic-homogeneous disposition.

The adsorbent particles may be disposed at least substantially completely or else at least partially on the layer of adhesive. In this case it is possible for at least 50%, especially at least 70% preferably at least 90%, more preferably at least 95%, of the adsorbent particles, based on the total number of the adsorbent particles, to be disposed on the layer of adhesive.

Moreover, the adsorbent particles, especially activated carbon particles, may be disposed at least substantially completely or else at least partially in the layer of adhesive, especially incorporated and/or integrated into the layer of adhesive. In this case at least 50%, especially at least 70%, preferably at least 90%, more preferably at least 95%, of the adsorbent particles (5), based on the total number of adsorbent particles (5), may be disposed in the layer (3) of adhesive, especially incorporated and/or integrated into the layer (3) of adhesive.

In particular, the adsorbent particles, especially activated carbon particles, may be disposed and/or incorporated and/or present in the layer of adhesive, especially incorporated and/or integrated into the layer of adhesive, in a thickness section with a thickness of at least 5%, especially at least 10%, preferably at least 30%, more preferably at least 50%, very preferably at least 70%, especially preferably at least 90%, based on the total thickness of the layer of adhesive. The thickness section comprising the adsorbent particles, especially activated carbon particles, is disposed in particular on that side of the layer of adhesive that is facing away from the carrier. The adsorbent particles, especially activated carbon particles, may be disposed and/or present in the layer of adhesive, especially incorporated and/or integrated into the layer of adhesive, at least substantially in the entire thickness of the layer of adhesive.

In accordance with the invention it is of advantage in this context if the adsorbent particles disposed and/or present on the layer of adhesive have a larger mean particle size (D50), especially mean particle diameter (D50), than the adsorbent particles disposed and/or present at least substantially completely or else at least partially in the layer of adhesive.

In this respect it is possible for the ratio of the mean particle size (D50), especially the mean particle diameter (D50), of the adsorbent particles disposed and/or present at least substantially completely or else at least partially on the layer of adhesive, on the one hand, to the mean particle size (D50), especially the mean particle diameter (D50), of the adsorbent particles disposed and/or present in the layer of adhesive, especially incorporated and/or integrated into the layer of adhesive, at least substantially completely or else at least partially, on the other hand [particle size (D50), especially mean particle diameter (D50), of the applied adsorbent particles:particle size (D50), especially mean particle diameter (D50), of the incorporated adsorbent particles] to be in the range from 100:1 to 1:1, especially in the range from 50:1 to 1.05:1, preferably in the range from 40:1 to 1.1:1, more preferably in the range from 30:1 to 1.5:1, very preferably in the range from 20:1 to 2:1, especially preferably in the range from 10:1 to 3:1.

Moreover, it may be the case in accordance with the invention that the adsorbent particles disposed and/or present on the layer of adhesive have a larger mean particle size (D50), especially mean particle diameter (D50), than the catalytic and/or reactive particles disposed and/or present at least substantially completely or else at least partially in the layer of adhesive. By this means, the catalytic and/or reactive particles, disposed in particular in the foam layer, are relieved in a particularly efficient way from the adsorbent particles disposed on the surface of the layer of adhesive, since noxiant and/or poison agents impinging on the unit of the invention in the application scenario are first taken up and/or adsorbed by the adsorbent particles disposed on the surface, with corresponding relief of the catalytic and/or reactive particles disposed in the layer of adhesive. Moreover, the disposition of the adsorbent particles on the surface of the layer of adhesive leads to a reduction in the flow velocity in the layer of adhesive with the catalytic and/or reactive particles incorporated therein, thereby increasing the contact time of the particles with the noxiant and/or poison agents with at the same time high accessibility of the catalytic and/or reactive particles.

In particular it is possible for the ratio of the mean particle size (D50), especially the mean particle diameter (D50), of the adsorbent particles disposed and/or present at least substantially completely or else at least partially on the layer of adhesive, on the one hand, to the mean particle size (D50), especially the mean particle diameter (D50), of the catalytic and/or reactive particles disposed and/or present in the layer of adhesive, especially incorporated and/or integrated into the layer of adhesive, at least substantially completely or else at least partially, on the other hand [particle size (D50), especially mean particle diameter (D50), of the applied adsorbent particles:particle size (D50), especially mean particle diameter (D50), of the incorporated catalytic and/or reactive particles] to be in the range from 100:1 to 1:1, especially in the range from 50:1 to 1.05:1, preferably in the range from 40:1 to 1.1:1, more preferably in the range from 30:1 to 1.5:1, very preferably in the range from 20:1 to 2:1, especially preferably in the range from 10:1 to 3:1.

According to an inventively preferred embodiment whereby the unit of the invention has catalytic and/or reactive and also adsorptive properties, it may be the case in accordance with the invention that the catalytic and/or reactive particles are disposed at least substantially completely or else at least partially in the layer of adhesive, especially are incorporated and/or integrated into the layer of adhesive, especially where at least 50%, especially at least 70%, preferably at least 90%, more preferably at least 95%, of the catalytic and/or reactive particles, based on the total number of catalytic and/or reactive particles, are disposed in the layer of adhesive, especially are incorporated and/or integrated into the layer of adhesive, and that the adsorbent particles, especially activated carbon particles, are disposed at least substantially completely or else at least partially on the layer of adhesive, especially where at least 50%, especially at least 70%, preferably at least 90%, more preferably at least 95%, of the adsorbent particles, based on the total number of adsorbent particles, are disposed on the layer of adhesive.

According to this embodiment, it may be the case in accordance with the invention that the adsorbent particles, especially activated carbon particles, have a larger particle size, especially a larger particle diameter, and/or a larger mean particle size (D50), especially a larger mean particle diameter (D50), than the catalytic and/or reactive particles. In this respect it is possible for the particle size, especially the particle diameter, and/or the mean particle size (D50), especially the mean particle diameter (D50), of the adsorbent particles to be larger by at least 10%, especially at least 25%, preferably at least 50% than the corresponding size of the catalytic and/or reactive particles, based on the corresponding size of the catalytic and/or reactive particles.

In this context it is the case in particular that the adsorbent particles, especially activated carbon particles, are disposed on the side of the layer of adhesive that is facing away from the carrier.

In this context the applicant has found, completely surprisingly, that in terms of the protective properties with respect to the aforesaid noxiant and/or poison agents, great importance attaches to the arrangement of the respective particles and the harmonization of the particle sizes of adsorbent particles on the one hand and catalytic and/or reactive particles on the other. In accordance with the invention, particularly good protective properties are provided here if the catalytic and/or reactive particles are disposed in the layer of adhesive and the adsorbent particles on the layer of adhesive, and if the relevant particles have the above-recited sizes (or size ratios).

In the context of the present invention, a multiplicity of absorptive materials may be used for the adsorbent particles. In this context, it may be the case in accordance with the invention that the adsorbent particles are selected from the group of
(i) especially particulate activated carbon and/or activated carbon particles, preferably in the form of activated carbon particles in granule form ("granulocarbon") or sphere form ("spherocarbon");
(ii) zeolites, especially natural and/or synthetic zeolites;
(iii) molecular sieves, especially zeolitic molecular sieves, synthetic molecular sieves and/or especially synthetic molecular sieves based on carbon, oxides and/or glasses;
(iv) ion exchanger resins, especially polydisperse and/or monodisperse cation and/or anion exchangers, especially of the gel type and/or macroporous type;
(v) mineral granules;
(vi) clathrates; and also
(vii) their mixtures and/or combinations.

In accordance with the invention, however, it is preferred if the adsorbent particles are formed and/or consist of especially particulate activated carbon and/or activated carbon particles, preferably in the form of activated carbon particles in granule form ("granulocarbon") or sphere form ("spherocarbon"). According to the invention, therefore, the adsorbent particles are preferably particulate activated carbon or activated carbon particles.

For further properties in relation to the adsorbent particles used in accordance with the invention, reference may be made to the relevant dependent claims.

The corresponding particle sizes, especially particle diameters, of the particulate bodies used in accordance with the invention, especially of the catalytic and/or reactive particles and/or the adsorbent particles, may be determined on the basis of the ASTM D2862-97/04 method. Moreover, the aforesaid sizes may be determined by methods based on sieve analysis, based on X-ray diffraction, laser diffractometry or the like. The respective methods of determination are as such well known to the skilled person, so no further observations are required in that regard.

The adsorbent particles in the form of activated carbon or of activated carbon particles that can be used in the context of the present invention are in general available commercially or customary in the trade. In particular, activated carbons and activated carbon particles having the specifications according to the invention may be employed, and are sold, for example, by Blucher GmbH, Erkrath, Germany, or by AdsorTech GmbH, Premnitz, Germany.

According to one inventively preferred embodiment, whereby activated carbon and/or activated carbon particles is/are used as adsorbent particles or as adsorptive material, the activated carbon, moreover, may be obtainable by carbonizing and subsequently activating a synthetic and/or non-naturally based starting material, especially based on organic polymers.

In this context, the activated carbon may be obtained from a starting material based on organic polymers, especially based on sulfonated organic polymers, preferably based on divinylbenzene-crosslinked polystyrene, more preferably based on styrene/divinylbenzene copolymers, especially by carbonizing and subsequently activating the starting material. In this context, the divinylbenzene content of the starting material may be in the range from 1 wt % to 20 wt %, especially 1 wt % to 15 wt %, preferably 1.5 wt % to 12.5 wt %, more preferably 2 wt % to 10 wt %, based on the starting material.

According to the invention, the starting material for the activated carbon may be an especially sulfonated ion exchanger resin and/or one containing sulfonic acid groups, especially of the gel type.

According to one inventively preferred embodiment, the activated carbon used may be a Polymer-based Spherical Activated Carbon (PBSAC). In particular, the activated carbon may be a polymer-based spherical activated carbon (PBSAC). Activated carbons of this type are notable for outstanding absorptive properties with respect to the aforementioned noxiant and/or poison agents and for outstanding mechanical properties, such as high physical hardness and high abrasion resistance.

The activated carbon which may be used in accordance with the invention may be obtained in principle by known methods of the prior art: In particular, for this purpose, spherical sulfonated organic polymers, particularly based on divinylbenzene-crosslinked polystyrene, are carbonized and then activated to afford the activated carbon in question, especially as noted above. Further details in this regard may be found for example in the publications DE 43 28 219 A1, DE 43 04 026 A1, DE 196 00 237 A1 and also EP 1 918 022 A1 or in the parallel U.S. Pat. No. 7,737,038 B2, which belongs to the same patent family; the respective content of these publications is hereby incorporated in its entirety by reference. With regard to microporous activated carbon which may equally be used in accordance with the invention, moreover, reference may be made to the applicant's own European patent application EP 1 918 022 A1 and also to the parallel US 2008/0107589 A1, the respective disclosure content of which is hereby incorporated in its entirety by reference.

For the determination of the other properties and/or parameters underlying the adsorbent particles that can be used in accordance with the invention, reference may additionally be made, in addition to the above statements, to the following:

The Gurvich determination of total pore volume is a method of measurement/determination which is well known per se to the skilled person in this field. For further details regarding the Gurvich determination of total pore volume, reference may be made for example to L. Gurvich (1915), *J. Phys. Chem. Soc. Russ.* 47, 805, and also to S. Lowell et al., Characterization of Porous Solids and Powders: Surface Area Pore *Size and Density, Kluwer Academic Publishers, Article Technology Series*, pages 111 ff. In particular, the pore volume of the activated carbon may be determined on the basis of the Gurvich rule as per the formula $V_P=W_a/\rho_l$, where $W_a$ is the adsorbed amount of an underlying adsorbate and $\rho_l$ is the density of the adsorbate employed (cf. also formula (8.20) as per page 111, section 8.4.) from S. Lowell et al.).

The carbon black method of determination is known per se to the skilled person; moreover, for further details of the carbon black method of determining the pore surface area and the pore volume, reference may be made for example to R. W. Magee, *Evaluation of the External Surface Area of Carbon Black by Nitrogen Adsorption, Presented at the Meeting of the Rubber Division of the American Chem. Soc.*, October 1994, as cited in, for example: *Quantachrome Instruments, AUTOSORB-1, AS1 Win Version* 1.50, *Operating Manual, OM,* 05061, *Quantachrome Instruments* 2004, Florida, USA, pages 71 ff. In particular, a t-plot method may be used to analyze the data in this regard.

Determining the specific surface area by the BET method is in principle known per se to the skilled person, and so no further details need be provided in this regard. All of the BET surface areas reported pertain to the determination as per ASTM D6556-04. In the context of the present invention, the so-called Multi-Point BET method of determination (MP-BET) in a partial pressure range $p/p_0$ from 0.05 to 0.1 is employed for determining the BET surface area, in general and unless expressly indicated otherwise.

For further details regarding the determination of the BET surface area and regarding the BET method, reference may be made to the aforesaid ASTM D6556-04 and also to Römpp Chemielexikon, 10th edition, Georg Thieme Verlag, Stuttgart/New York, headword: "BET-Methode", including the references cited there, and to Winnacker-Küchler (3rd edition), volume 7, pages 93 ff. and also to Z. Anal. Chem. 238 pages 187 to 193 (1968).

In the context of the present invention, the term "micropores" refers to pores having pore diameters of less than 2 nm, whereas the term "mesopores" refers to pores having pore diameters in the range from 2 nm (i.e., 2 nm inclusive) up to 50 nm inclusive, and the term "macropores" refers to pores having pore diameters of more than 50 nm (i.e. >50 nm).

For corresponding further embodiments and refinements of the present invention, reference may be made to the dependent claims concerning the catalytic and/or reactive unit of the invention.

Overall, in accordance with the invention, a catalytic and/or reactive unit is provided which possesses a durably high protective function with respect to noxiant and/or poison agents of the aforesaid kind.

A further subject of the present invention—according to a further aspect of the present invention—is, moreover, the method of the invention for producing the catalytic and/or reactive unit of the invention, especially as defined above, preferably in the form of a protective material having catalytic and/or reactive properties, especially with protective function toward chemical and/or biological noxiant and/or poison agents, preferably in the form of a textile protective filter material, preferably for producing a—especially textile—catalytic and/or reactive protective filter material, where a—especially an air-pervious—carrier, especially in the form of a textile carrier, is charged and/or furnished and/or provided with a multiplicity of discrete catalytic and/or reactive particles, where the catalytic and/or reactive particles are durably joined to the carrier, especially by adhesive bonding, and/or are bonded to the carrier, where the layer of adhesive is configured as an air-pervious and/or discontinuous layer based on a dried and/or cured, especially crosslinked, broken adhesive polymer foam.

For further embodiments in this regard, reference may be made to the corresponding co-independent and dependent claims relating to the method of the invention.

Overall, in the context of the present invention, an efficient method is provided for producing or providing the catalytic and/or reactive unit of the invention.

The present invention further relates—according to a further aspect of the present invention—to the use of the catalytic and/or reactive unit of the invention, as defined above, for producing protective equipment and/or protective articles of any kind, especially protective apparel, especially for the civilian or military sector, such as protective suits, protective gloves, protective footwear, protective socks, head protective apparel and the like, and of protective coverings of any kind, preferably all aforesaid protective materials for NBC deployment and/or with protective function toward radioactive noxiant and/or poison agents and/or toward biological noxiant and/or poison agents and/or toward chemical noxiant and/or poison agents.

In this context, the present invention also relates to the use of the catalytic and/or reactive unit of the invention, as defined above, for producing filters and filter materials of any kind, especially for removal of noxiant, odorant and poison agents of any kind, preferably for removal of radioactive noxiant and/or poison agents and/or of biological noxiant and/or poison agents and/or of chemical noxiant and/or poison agents, especially from air and/or gas streams, such as NBC respirator filters, odor filters, sheet filters, air filters, especially filters for indoor air cleaning, adsorption-capable carrier structures and filters for the medical sector.

Yet another subject of the present invention—according to a further aspect of the present invention—are the protective equipment and/or protective articles of any kind, especially for the civilian or military sector, especially protective apparel, such as protective suits, protective gloves, protective footwear, protective socks, head protective apparel and the like, and also protective coverings, preferably all aforesaid protective equipment and/or protective articles for NBC deployment and/or with protective function toward radioactive noxiant and/or poison agents and/or toward biological noxiant and/or poison agents and/or toward chemical noxiant and/or poison agents, produced using the inventive catalytic and/or reactive unit as defined above and/or comprising the inventive catalytic and/or reactive unit as defined above. Lastly, a further subject of the present invention—according to a further aspect of the present invention—are filters and filter materials of any kind, especially for removal of noxiant, odorant and poison agents of any kind, preferably for removal of radioactive noxiant and/or poison agents and/or of biological noxiant and/or poison agents and/or of chemical noxiant and/or poison agents, especially from air and/or gas streams, such as respirator filters, odor filters, sheet filters, air filters, especially filters for indoor air cleaning, adsorption-capable carrier structures and filters for the medical sector, produced using the inventive catalytic and/or reactive unit as defined above, and/or comprising the inventive catalytic and/or reactive unit as defined above.

The present invention is described below with reference to drawings or figures representing preferred embodiments and/or working examples, with the relevant observations applying to all aspects of the invention and with the corresponding preferred embodiments being in no way limiting.

Shown in the figures are the following:

FIG. 1: a cross-sectional depiction of an inventive catalytic and/or reactive unit especially in the form of a protective material, where the unit comprises a carrier, especially a textile carrier, with a layer of adhesive applied thereon in the form of an air-pervious, dried and/or cured, broken adhesive polymer foam, where a multiplicity of individual catalytic and/or reactive particles are adhered on the layer of adhesive;

FIG. 2: a cross-sectional depiction of a further inventive catalytic and/or reactive unit, where the catalytic and/or reactive particles are disposed such that the catalytic and/or reactive particles are disposed and integrated, respectively, partially on the surface and partially in the layer of adhesive;

FIG. 3: a cross-sectional depiction of yet a further inventive catalytic and/or reactive unit, whereby the catalytic and/or reactive particles are disposed in such a way that the layer of adhesive is furnished over its entire thickness with the catalytic and/or reactive particles integrated therein;

FIG. 4: a cross-sectional depiction of yet a further inventive catalytic and/or reactive unit, whereby the inventive unit comprises catalytic and/or reactive particles disposed in the layer of adhesive and integrated into the layer of adhesive, and additionally adsorbent particles disposed and/or applied on the surface of the layer of adhesive;

FIG. 5: a cross-sectional depiction of a further inventive catalytic and/or reactive unit having catalytic and/or reactive particles catalytic and/or reactive particles integrated and/or disposed in the layer of adhesive and also having additional adsorbent particles likewise disposed and/or integrated in the layer of adhesive;

FIG. 6: a cross-sectional depiction of an inventive catalytic and/or reactive unit, where the inventive unit additionally comprises a covering layer, especially covering material, where the layer of adhesive with the catalytic and/or reactive particles is disposed between the carrier and the covering layer, especially covering material.

The figures as per FIG. 1 to FIG. 6 therefore show an inventive catalytic and/or reactive unit 1, which is present especially in the form of a protective material having catalytic and/or reactive properties, where the inventive unit 1 comprises a carrier 2, especially an air-pervious carrier 2, which may be configured especially in the form of a textile carrier, where the carrier 2 is charged and/or furnished and/or provided with a multiplicity of discrete catalytic and/or reactive particles 4, where the catalytic and/or reactive particles 4 are durably joined to the carrier 2, especially by adhesive bonding, and/or are bonded to the carrier 2, where the joining and/or adhesive bonding is accomplished and/or brought about by a layer 3 of adhesive applied to the carrier 2, where the layer 3 of adhesive is configured as an air-pervious and/or discontinuous layer based on a dried and/or cured, especially crosslinked, broken adhesive polymer foam. It is also apparent from FIG. 1 to FIG. 6 that the layer 3 of adhesive may extend partially into the carrier 2, especially the textile carrier 2, leading to a stable and durable join of the carrier 2 to the layer 3 of adhesive and hence to a stable layered assembly.

FIG. 1 shows, moreover, an inventive embodiment whereby the catalytic and/or reactive particles 4 are disposed on the layer 3 of adhesive, where the catalytic and/or reactive particles 4 are positioned on the surface of the layer 3 of adhesive that is on the side facing away from the carrier 2. The relevant application of the catalytic and/or reactive particles 4 may be accomplished, for example, by scattering, trickling or the like of the particles 4 onto the adhesive polymer foam and/or onto the layer 3 of adhesive, which has been applied beforehand to the carrier 2 and not yet (fully) dried and/or cured; optionally, this is followed by pressing and/or impressing. For an inventive embodiment of this kind, the use of catalytic and/or reactive particles 4 having relatively large particle sizes, especially relatively large particle diameters, is suitable, since this prevents excessive sinking into the adhesive polymer foam.

FIG. 2 shows a further inventive embodiment, whereby the catalytic and/or reactive particles extend at least partially into the layer 3 of adhesive, so that some of the catalytic and/or reactive particles 4 are incorporated in the layer 3 of adhesive and/or integrated into the layer 3 of adhesive and/or the adhesive polymer foam. FIG. 2 also shows that a part of the catalytic and/or reactive particles 4 is disposed on the surface of the layer 3 of adhesive that is facing away from the carrier 2. An arrangement of the catalytic and/or reactive particles in this way may be realized, for example, by scattering the particles 4 onto the adhesive foam, applied to the carrier 2 and not yet (fully) dried or cured, and/or onto the corresponding layer 3 of adhesive, and then pressing them in the direction of the layer of adhesive 3 and/or impressing them into the layer 3 of adhesive, so that the particles 4 penetrate at least partially into the layer 3 of adhesive. In this way it is possible to achieve an overall increase in the (surface) occupancy of the layer of adhesive by the catalytic and/or reactive particles. Penetration of the catalytic and/or reactive particles 4 into the layer 3 of adhesive may also be controlled through their particle size, with the use of catalytic and/or reactive particles 4 having relatively small particle sizes, especially relatively small particle diameters, leading to increased penetration of the particles 4 into the layer 3 of adhesive.

FIG. 3 illustrates a further embodiment of the present invention, whereby the catalytic and/or reactive particles 4 are incorporated and/or integrated into the layer of adhesive 3, which is present in the form of a broken foam, in such a way that at least substantially the entire thickness of the layer 3 of adhesive and hence the layer 3 of adhesive overall is furnished with the particles 4. According to this embodiment, therefore, the catalytic and/or reactive particles 4 extend over the entire thickness of the layer 3 of adhesive.

This allows particularly high loading quantities to be realized for the catalytic and/or reactive particles 4. As a result of the, so to speak, three-dimensional arrangement of the catalytic and/or reactive particles 4 in the adhesive carrier 3, it is possible to achieve further improvement in the protective function of the inventive unit 1. This inventive embodiment enables or is suitable for the use of catalytic and/or reactive particles 4 having relatively small particle sizes, especially relatively small particle diameters, with further provision to the effect that the catalytic and/or reactive particles 4 each have different particle sizes from one another, especially different particle diameters. An inventive unit 1 of this kind with catalytic and/or reactive properties may be obtained by first (i.e., before application of the layer 3 of adhesive) preparing a suspension of the catalytic and/or reactive particles 4 in the undried or uncured adhesive or adhesive polyfoam on which the layer 3 of adhesive is based, and subsequently applying the resulting suspension to the carrier 2, the suspension being in the form of the adhesive polyfoam furnished with the particles 4. Subsequently, drying and/or curing may be carried out to give the layer 3 of adhesive in the form of the dried and/or cured, especially crosslinked, broken adhesive polymer foam with the catalytic and/or reactive particles 4 incorporated and/or integrated therein.

FIG. 4 shows one more refinement of the present invention in the form of a further embodiment, whereby, in addition to the catalytic and/or reactive particles 4 for the inventive catalytic and/or reactive unit 1, there are also adsorbent particles 5 used, in the form of activated carbon particles, for example. FIG. 4 shows here that the catalytic and/or reactive particles 4 are incorporated and/or integrated at least substantially completely into the layer 3 of adhesive, whereas the adsorbent particles 5 are applied or adhered on the layer 3 of adhesive. In this context, inventive provision may be made for the adsorbent particles 5 to have larger particle sizes and/or larger particle diameters than the catalytic and/or reactive particles 4. An inventive unit 1 of this kind may be produced, for example, by first preparing a suspension of the catalytic and/or reactive particles with the undried and/or uncured adhesive or adhesive polymer foam on which the layer 3 of adhesive is based, and subsequently applying the suspension to the textile carrier 2 to give the layer 3 of adhesive. After that, the adsorbent particles 5 may then be mounted onto the as yet not (fully) dried and/or as yet not (fully) cured layer 3 of adhesive comprising the catalytic and/or reactive particles 4. For this purpose, for example, the adsorbent particles 5 may be scattered onto the layer 3 of adhesive and optionally pressed and/or impressed. Subsequently, drying and/or curing may be carried out to give the layer 3 of adhesive in the form of the dried and/or cured, especially crosslinked, broken adhesive polymer foam with the catalytic and/or reactive particles 4 incorporated and/or integrated therein and with the applied adsorbent particles 5. The result on this basis, therefore, is an inventive catalytic and/or reactive unit 1 which as well as the catalytic and/or reactive properties also possesses adsorptive properties.

FIG. 5 illustrates a further inventive embodiment of a catalytic and/or reactive unit 1, whereby not only the catalytic and/or reactive particles 4 but also the adsorbent particles 5 are incorporated and/or integrated at least substantially completely into the layer 3 of adhesive. In this respect, it is possible first of all to prepare a joint suspension of the catalytic and/or reactive particles 4 and of the adsorbent particles 5 in the adhesive or adhesive polymer foam on which the layer 3 of adhesive is based, after which the suspension in question can be applied to the carrier 2 to give the layer 3 of adhesive, and dried and/or cured.

FIG. 6, lastly, shows an inventive embodiment whereby the inventive catalytic and/or reactive unit 1, with the layer 3 of adhesive applied to a carrier 2, especially a textile carrier 2, and with the catalytic and/or reactive particles 4 incorporated and/or mounted on the layer 3 of adhesive, is additionally provided with a covering material 6 or covering layer 6, where the covering material 6 or the covering layer 6 is disposed on that side of the layer 3 of adhesive that is facing away from the carrier 2. The covering material 6 or the covering layer 6 may be configured, for example, as a particle filter or aerosol filter layer, and so the inventive catalytic and/or reactive unit, in addition to catalytic and also, possibly, adsorptive properties, additionally possesses corresponding filter properties in respect of (dust) particles and/or aerosols. Moreover, the covering material 6 or the covering layer 6 may be fixed on the adhesive layer and/or on the particles, using a bonding agent or adhesive agent, for example, which may be present or used continuously or discontinuously, especially discontinuously-punctuately, like a net (in the form of a web of adhesive, for example).

Further refinements, versions, variations, modifications, special features, and advantages of the present invention are readily apparent to and realizable by the skilled person on reading the description, without their having to depart the realm of the present invention.

The present invention is illustrated by the following exemplary embodiments which, however, are not intended in any way to limit the present invention.

Exemplary Embodiments

Different catalytic and/or reactive units in the form of protective materials are produced, namely inventive protective materials A1 to A7 and also a comparative protective material B.

The catalytic and/or reactive units present in the form of protective materials are produced using—as catalytic and/or reactive particles and/or as catalytic and/or reactive (metal) components—materials based on various particulate metal-organic framework (MOF, Metal Organic Framework) materials, specifically in each case using copper (Cu), zinc (Zn) and titanium (Ti) as the metal component. To produce the respective MOF materials, the metal components are employed together with 1,3,5-benzenetricarboxylic acid (trimesic acid) or 1,1'-binaphthyl-4,4'-dicarboxylate (BNDC) or 4,4'-biphenyldicarboxylate (BPDC) or 4,4',4"-triphenyldicarbonate (TPDC) or 1,4-benzenedicarboxylate (BDC) as exemplary ligands. The particulate MOF-based materials obtained in this way and used as catalytic and/or reactive particles have a mean particle diameter (D50) of approximately 20 μm and are referred to hereinafter as Cu-MOF, Zn-MOF and Ti-MOF, depending on the metal component used. For further statements in this regard referring to the production of the MOF materials used in accordance with the invention, reference may be made in particular to the exemplary embodiments relating to the applicant's international patent application WO 2009/056184 A1 and also to the parallel patent applications DE 10 2008 005 218 A1 and U.S. Pat. No. 2,011,010 826 A.

The inventive protective materials A1 to A7 and also the comparative protective material B are each produced using an air-pervious textile carrier layer (carrier) having a basis weight of approximately 80 g/m$^2$.

The inventive catalytic and/or reactive units in the form of the respective protective materials A1 to A3 are produced such that, for the individual protective materials, an aforesaid particulate MOF material is used in each case, with material A1 comprising catalytic and/or reactive particles based on Cu-MOF (A1-Cu-MOF), material A2 comprising catalytic and/or reactive particles based on Zn-MOF (A2-Zn-MOF), and material A3 comprising catalytic and/or reactive particles based on Ti-MOF (A3-Ti-MOF). The MOF-based particles here are incorporated and/or integrated into the adhesive layer. For this purpose, first of all, a suspension of the respective MOF-based particles in the material forming the basis for the adhesive layer to be subsequently formed, this material taking the form of a solution or dispersion of an adhesive polymer based on a polyurethane, is produced. The adhesive polymer solution or dispersion used for producing the suspension has, as such, a density of approximately 200 g/l for a solids content of approximately 50%, based on the solution or dispersion. To produce the inventive protective materials A1 to A4, the textile carrier layer is coated over the full area with the suspension based on the aqueously based solution or dispersion of the adhesive polymer containing the incorporated catalytic and/or reactive particles, this suspension having been foamed beforehand with importation of mechanical energy; the adhesive layer in the form of the foamed suspension based on the solution or dispersion of the adhesive polymer with the catalytic and/or reactive particles incorporated therein is applied to the textile carrier by knife coating. Application here takes place in a quantity of approximately 100 g/m² (wet weight); the (application) amount of the solution or dispersion of the adhesive polymer as such that is used is approximately 65 g/m². The layer thus applied has a thickness of approximately 0.4 mm. Drying and/or curing of the suspension applied to the carrier is carried out, this suspension being based on the solution or dispersion of the adhesive polymer with the incorporated MOF-based particles, for the purpose of further fixing the particles and of configuring the dried or cured broken adhesive polymer foam or the cured adhesive layer with the broken foam and the particles incorporated therein. This drying or curing takes place at a temperature between 100° C. and 150° C. The dried adhesive layer in the form of the broken foam with the MOF material incorporated therewith has a dry weight of approximately 65 g/m². The resulting inventive protective materials comprise the particulate MOF material in a loading amount of approximately 35 g/m².

The formation of the dried and/or cured broken adhesive polymer foam is accomplished—without wishing to be limited to this theory—on the one hand by the mechanical action when applying the adhesive layer to the carrier and also, on the other hand, by the escape of solution and/or dispersion media, more particularly water, during the drying of the adhesive layer, leading to the foam bubbles and/or the underlying foam structures (struts, walls, lamellae and/or the like) being broken open.

This results in inventive protective materials A1 to A3 in the form of A1-Cu-MOF, A2-Zn-MOF and A3-Ti-MOF, as indicated above.

Furthermore, inventive catalytic and/or reactive units are produced in the form of protective materials (protective materials A4 to A7), where the protective materials further comprise discrete adsorbent particles in the form of activated carbon. Employed as catalytic and/or reactive particles is the aforementioned particulate Cu-MOF. The inventive protective materials A4 to A7 are produced as described for the inventive materials A1 to A3, but with the proviso that, additionally, adsorbent particles in the form of activated carbon are applied to the adhesive layer, applied on the carrier and containing the particulate MOF material, integrated therein, in the undried and/or uncured state; application of the activated carbon is accomplished by scattering and gentle pressing, with a charging amount of approximately 30 g/m². This results, therefore, in inventive protective materials A4 to A7, which, additionally to the particulate MOF-based particles based on Cu-MOF and integrated into the broken foam of the adhesive layer, further comprise adsorbent particles applied to the adhesive layer, in the form of particulate activated carbon. For the respective inventive protective materials A4 to A7, different size ratios of the mean particle diameter (D50) of the adsorbent particles in the form of activated carbon, on the one hand, to the catalytic and/or reactive particles based on Cu-MOF, on the other hand, are used. In this respect, a size ratio of the mean particle diameter (D50) of the adsorbent particles on the one hand to the mean particle diameter (D50) of the catalytic and/or reactive particles on the other [mean particle diameter (D50) activated carbon:mean particle diameter (D50) Cu-MOF] is 1:2 for protective material A4, 1:1 for protective material AS, 2:1 for protective material A6, and 5:1 for protective material A7. Accordingly, then, this results in inventive protective materials A4-1:2, AS-1:1, A6-2:1 and A7-5:1.

Also produced is a comparative material in the form of protective material B, wherein the aforesaid particulate Cu-MOF is fixed on the carrier discontinuously in the context of a punctuate application using an unfoamed binder, in a distribution which is uniform and in the format of a dot grid. In this case the application rate of particulate Cu-MOF is also approximately 35 g/m²; the discontinuous-punctuate application takes place using an adhesion agent or binder based on a homogeneous, unfoamed adhesive in the form of polyurethane, with the application rate of the adhesive being approximately 15 g/m². This results in a degree of occupancy of the textile carrier by the particulate Cu-MOF of approximately 60%.

For the catalytic and/or reactive units and protective materials indicated above, the protective function with respect to noxiant and/or poison agents is investigated; in this context, the respective barrier effects for mustard gas and soman are determined in accordance with method 2.2 of CRDEC-SP-84010, in what is called the convective flow test. For this purpose, an air stream containing mustard gas or soman, respectively, is caused to flow at a constant flow resistance and at a flow velocity of about 0.45 cm/s against the respective filter protection material, and the area-specific breakthrough quantity is determined after 16 hours (80% relative humidity, 32° C., 10·1 µl HD/12.56 cm², or 12·1 µl GD/12.56 cm²); in this context, a lower area-specific breakthrough quantity denotes a correspondingly higher protective effect toward the poison agents in question:

| Material | Mustard gas | Soman |
|---|---|---|
| A1-Cu-MOF | 1.01 µg/cm² | 1.37 µg/cm² |
| A2-Zn-MOF | 1.12 µg/cm² | 1.44 µg/cm² |
| A3-Ti-MOF | 0.95 µg/cm² | 1.20 µg/cm² |
| A4-1:2 | 0.83 µg/cm² | 1.18 µg/cm² |
| A5-1:1 | 0.80 µg/cm² | 1.08 µg/cm² |
| A6-2:1 | 0.76 µg/cm² | 1.00 µg/cm² |
| A7-5:1 | 0.71 µg/cm² | 0.93 µg/cm² |
| B | 2.36 µg/cm² | 2.79 µg/cm² |

Additionally, further inventive protective materials A8 to A10 in accordance with the protective materials A1, A3 and A7 and as per the statements above are produced, with the proviso that the respective MOF material is additionally furnished or doped with a precious metal in the form of platinum (Pt), specifically in an amount of 5 wt %, based on the MOF material. The result is therefore inventive protective materials A8 (A8-Cu-MOF-Pt), A9 (A9-Ti-MOF-Pt) and A10 (A10-5:1-Pt). The resultant protective materials, as compared with the corresponding protective materials A1, A3 and A7, exhibit breakthrough quantities reduced by approximately 10%, and so there is a further improvement in the protective properties.

In the course of supplementary investigations of the aforesaid protective materials for their protective effect with respect to microorganisms, equally outstanding results are obtained in the case of the inventive materials: In experiments to verify the biostatic properties according to ASTM E2149-01 (*Klebsiella pneumoniae* and *Staphylococcus aureus*, each at 1.5 to $3.0 \times 10^5$ CFU/ml), the percentage reduction in relation to these pathogens after 24 hours for the inventive protective materials in the form of the materials A1 to A7 is in all cases above 95%, whereas a figure of only 64% can be found for the noninventive material B. Accordingly, the biological protective function of the inventive protective materials is also increased.

The results of experimentation show overall that the protective function of the inventive protective materials A1 to A7 in comparison to the comparative material B is sustainedly improved, demonstrating the outstanding activity of the catalytic and/or reactive unit of the invention in terms of the protective function toward chemical poison and/or warfare agents in conjunction with high air transmission rate and low basis weight. The protective function here can be further boosted through specific combination with a particulate adsorptive material in the form of activated carbon, and a further improvement is obtained if the adsorbent particles in the form of activated carbon that are used have larger mean particular diameters by comparison with the catalytic and/or reactive particles.

Overall, the investigations recited above show the outstanding properties of the catalytic and/or reactive units provided on the basis of the concept of the invention, and, respectively, of the protective materials provided accordingly.

LIST OF REFERENCE NUMERALS

1 Catalytic and/or reactive unit
2 Carrier
3 Layer of adhesive
4 Catalytic and/or reactive particles
5 Adsorbent particles
6 Covering layer/covering material

The invention claimed is:

1. A catalytic or reactive unit in the form of a protective material having catalytic or reactive properties and providing protective function towards chemical and biological noxiants and poisons,
wherein the unit comprises an air-pervious sheetlike textile support, wherein the support is provided with a multiplicity of discrete catalytic or reactive particles,
wherein the catalytic or reactive particles comprise at least one catalytic or reactive component, wherein the catalytic or reactive component comprises a MOF material (Metal Organic Framework material),
wherein the catalytic or reactive particles are permanently adhered to the support by adhesive bonding, wherein the adhesive bonding is provided by an adhesive layer applied to the support, wherein the adhesive layer is an air-pervious and discontinuous layer including a dried and cured broken adhesive polymer foam,
wherein the catalytic or reactive particles are combined with a multiplicity of adsorbent particles in the form of discrete activated carbon particles, and
wherein the adsorbent particles have a larger mean particle size D50 than the catalyst or reactive particles.

2. The unit as claimed in claim 1,
wherein the catalytic or reactive component is used in bulk form and without any support component.

3. The unit as claimed in claim 1,
wherein the catalytic or reactive particles comprise the catalytic or reactive component provided on a support component.

4. The unit as claimed in claim 1,
wherein the MOF material comprises repeating structural units, each based on at least one metal, and at least one bidentate or bridging organic ligand;
wherein the at least one metal is selected from the group consisting of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi; and
wherein the at least one bidentate or bridging organic ligand comprises at least one functional group which is capable of forming at least two coordinative chemical bonds to a metal, wherein the functional group of the ligand comprises at least one heteroatom selected from the group consisting of N, O, S, B, P, Si and Al.

5. The unit as claimed in claim 1,
wherein the MOF material is present in crystalline form.

6. The unit as claimed in claim 1,
wherein the MOF material is present in activated form, wherein activation has been effected by heat-treatment.

7. The unit as claimed in claim 1,
wherein the catalytic or reactive particles and the layer adhesive are used in a quantity ratio of catalytic or reactive particles/adhesive layer in the range of from 10:1 to 1:5.

8. The unit as claimed in claim 1,
wherein the catalytic or reactive particles are granular or spherical in shape and have a mean particle size D50 in the range of from 0.0001 mm to 2.5 mm; and
wherein the catalytic or reactive particles are used in an amount in the range of from 5 $g/m^2$ to 150 $g/m^2$.

9. The unit as claimed in claim 1,
wherein the adsorbent particles are permanently adhered to the support by adhesive bonding, wherein the adhesive bonding is provided by the adhesive layer applied to the support.

10. The unit as claimed in claim 1,
wherein the adsorbent particles are granular or spherical in shape and have a mean particle size D50 in the range of from 0.005 mm to 2.5 mm; and
wherein the adsorbent particles are used in an amount in the range of from 5 $g/m^2$ to 150 $g/m^2$.

11. The unit as claimed in claim 1,
wherein the catalytic or reactive particles and the adsorbent particles are disposed at least partially in the layer adhesive.

12. The unit as claimed in claim 1,
wherein the mean particle size D50 of the adsorbent particles is larger by at least 10% than the mean particle size D50 of the catalytic or reactive particles, based on the mean particle size D50 of the catalytic or reactive particles.

13. The unit as claimed in claim 1,
wherein the broken adhesive polymer foam of the adhesive layer comprises a multiplicity of dried and cured collapsed foam bubbles.

14. The unit as claimed in claim 1,
wherein the broken adhesive polymer foam of the adhesive layer comprises a multiplicity of destroyed, broken or collapsed walls or struts of adhesive polymer.

15. The unit as claimed in claim 1,
wherein the broken adhesive polymer foam of the adhesive layer comprises a multiplicity of apertures, pores, channels or openings.

16. The unit as claimed in claim 1,
wherein the broken adhesive polymer foam of the adhesive layer has a density reduced by 5% to 80% in comparison to a corresponding unfoamed adhesive polymer foam.

17. The unit as claimed in claim 1,
wherein the catalytic or reactive particles and the adsorbent particles independently of one another, are each permanently adhered to the broken adhesive polymer foam of the adhesive.

18. The unit as claimed in claim 1,
wherein the broken adhesive polymer foam is obtained by drying and curing an aqueously or organically based solution or dispersion of the adhesive polymer which is foamed by introduction of mechanical energy while entailing an at least partial breaking of the foam provided by the foamed solution or dispersion of the adhesive polymer.

19. The unit as claimed in claim 1,
wherein the adhesive polymer is selected from the group consisting of polyacrylate (PA), polymethacrylate (PMA), polymethyl methacrylate (PMMA), polycarbonate (PC), polyurethane (PU) and silicones.

20. A method for producing a catalytic or reactive unit as defined in claim 1,
wherein an air-pervious sheetlike textile support is provided with a multiplicity of discrete catalytic or reactive particles,
wherein the catalytic or reactive particles comprise at least one catalytic or reactive component, wherein the catalytic or reactive component comprises a MOF material (Metal Organic Framework material),
wherein the catalytic or reactive particles are permanently adhered to the support by adhesive bonding, wherein the adhesive bonding is provided by an adhesive layer applied to the support, wherein the adhesive layer is an air-pervious and discontinuous layer including a dried and cured broken adhesive polymer foam,
wherein the catalytic or reactive particles are further combined with a multiplicity of adsorbent particles in the form of discrete activated carbon particles and
wherein the adsorbent particles have a larger mean particle size D50 than the catalytic or reactive particles.

21. A piece of protective apparel providing protective function towards chemical and biological noxiants and poisons,
wherein the piece of protective apparel comprises a catalytic or reactive unit as defined in claim 1.

22. The piece of protective apparel unit as claimed in claim 21,
wherein the piece of protective apparel is selected from the group consisting of protective suits, protective gloves, protective footwear, protective socks, head protective apparel and protective.

23. A filter or filtering material providing protective function towards chemical and biological noxiants and poisons,
wherein the filter or filtering material comprises a catalytic or reactive unit as defined in claim 1.

24. The filter or filtering material as claimed in claim 23,
wherein the filter or filtering material is selected from the group consisting of respirator filters, odor filters, sheet filters, air filters, filters for indoor air cleaning, adsorption-capable support structures and filters for the medical sector.

25. A catalytic or reactive unit in the form of a protective material having catalytic or reactive properties and providing protective function towards chemical and biological noxiants and poisons,
wherein the unit comprises an air-pervious textile support, wherein the support is provided with a multiplicity of discrete catalytic or reactive particles,
wherein the catalytic or reactive particles comprise at least one catalytic or reactive component, wherein the catalytic or reactive component comprises a MOF material (Metal Organic Framework material),
wherein the catalytic or reactive particles are permanently adhered to the support by adhesive bonding, wherein the adhesive bonding is provided by an adhesive layer applied to the support, wherein the adhesive layer is an air-pervious and discontinuous layer of dried and cured broken adhesive polymer foam,
wherein the catalytic or reactive particles are combined with a multiplicity of adsorbent particles in the form of discrete activated carbon particles, and
wherein the adsorbent particles have a larger mean particle size D50 than the catalyst or reactive particles.

* * * * *